US011470609B2

(12) United States Patent
Zhou et al.

(10) Patent No.: US 11,470,609 B2
(45) Date of Patent: Oct. 11, 2022

(54) METHODS AND APPARATUS TO FACILITATE LAYER 1 CROSS-CARRIER REPETITION

(71) Applicant: QUALCOMM Incorporated, San Diego, CA (US)

(72) Inventors: Yan Zhou, San Diego, CA (US); Tao Luo, San Diego, CA (US); Xiaoxia Zhang, San Diego, CA (US); Seyed Ali Akbar Fakoorian, San Diego, CA (US); Mostafa Khoshnevisan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 158 days.

(21) Appl. No.: 16/878,382

(22) Filed: May 19, 2020

(65) Prior Publication Data

US 2020/0413402 A1    Dec. 31, 2020

Related U.S. Application Data

(60) Provisional application No. 62/868,743, filed on Jun. 28, 2019.

(51) Int. Cl.
*H04W 72/04*   (2009.01)
*H04L 1/18*    (2006.01)
*H04L 1/08*    (2006.01)

(52) U.S. Cl.
CPC ......... *H04W 72/0453* (2013.01); *H04L 1/08* (2013.01); *H04L 1/1812* (2013.01); *H04W 72/0413* (2013.01)

(58) Field of Classification Search
CPC ......... H04W 72/0453; H04W 72/0413; H04W 72/1284; H04L 1/1812; H04L 1/1854;
(Continued)

(56) References Cited

U.S. PATENT DOCUMENTS

| 8,483,164 B2 | 7/2013 | Zhang et al. |
| 10,079,659 B2 | 9/2018 | Lin |

(Continued)

OTHER PUBLICATIONS

Nokia et al: "Sunmary of [91-LTE-10]; Email discussion on candidate techniques for LTE URLLC", 3GPP Draft RI-1801864, 3rd Generation Partnership Project (3GPP), Mobile Competence Centre, 650, Route Des Lucioles, F-06921 Sophia-Antipolis Cedex , France; vol. RAN WGI, No. Athens, Greece Feb. 26, 2017-Mar. 2, 2017 Feb. 16, 2018 (Feb. 16, 2018), XP051397030, Retrieved from the Internet URL:http://www.3gpp.org/ftp/tsg%5Fran/WG1%5FRL1/TSGR1%5F92/Docs/ [retrieved on Feb. 16, 2018] Questions 2.1, 3.1, 3.3, 5.1.

(Continued)

*Primary Examiner* — Vinncelas Louis
(74) *Attorney, Agent, or Firm* — Arent Fox, LLP

(57) ABSTRACT

Apparatus, methods, and computer-readable media for facilitating layer 1 cross-carrier repetitions are disclosed herein. An example method for wireless communication includes determining a repetition configuration for semi-persistent scheduling (SPS) or a configured grant (CG) associated with a data transmission on a first entity and at least one repetition of the data transmission on a second entity. The example method also includes receiving the data transmission and the at least one repetition of the data transmission. The example method also includes combining the data transmission and the at least one repetition of the data transmission to decode the data transmission.

29 Claims, 14 Drawing Sheets

(58) Field of Classification Search
CPC ......... H04L 1/1861; H04L 5/001; H04L 1/08; H04L 1/04; H04L 5/0048; H04L 1/1887; H04L 5/0044

See application file for complete search history.

(56) References Cited

U.S. PATENT DOCUMENTS

| | | | |
|---|---|---|---|
| 10,187,878 | B2 | 1/2019 | Lin et al. |
| 2017/0164384 | A1* | 6/2017 | Wang ............. H04L 5/0044 |
| 2017/0346607 | A1* | 11/2017 | Chen ............. H04W 72/1284 |
| 2018/0006791 | A1* | 1/2018 | Marinier ......... H04W 52/0216 |
| 2019/0081750 | A1* | 3/2019 | Yang ............. H04L 5/0048 |
| 2019/0103946 | A1 | 4/2019 | Li et al. |
| 2019/0356455 | A1 | 11/2019 | Yang et al. |
| 2019/0386804 | A1* | 12/2019 | Pao ............. H04L 1/1887 |
| 2020/0106486 | A1 | 4/2020 | Nammi et al. |

OTHER PUBLICATIONS

Huawei et al: CSI and MCS design for LTE URLLC, 3GPP Draft; RI-1801869, 3rd Generation Partnership Project (3GPP), Mobile Competence Centre; 650, Route Des Lucioles; F-86921 Sophia-Antipolis Cedex; France, vol. RAN WGI, No. Athens, Greece; Feb. 26, 2018-Mar. 2, 2018 Feb. 16, 2018 (Feb. 16, 2018), XP051397436, Retrieved from the Internet: URL:http://www.3gpp.org/ftp/tsg5Fran/WG1%5FRL1/TSGR1%5F92/Docs/ [retrieved on Feb. 16, 2018] p. 2.

Nokia et al: "Summary of Thursday offline discussion on PUSCH enhancements for NR URLLC (AI 7.2.6 3)", 3GPP Draft; RI-1907861 Summary of Thursday Offline Discussion On 7.2.6.3 EURLLC PUSCH ENH, 3rd Generation Partnership Project (3GPP), Mobile Competence Centre; 650, Route Des Lucioles; F-06921 Sophi, vol. RAN WGI, No. Reno, Nevada, US; May 13, 2019-May 17, 2019 May 17, 2019 (May 17, 2019), XP051740133, Retrieved from the Internet URL:http://www.3gpp.org/ftp/tsg%5Fran/WG1%5FRL1/TSGR1%5F97/Docs/R1%2D1907861%2Ezip[retrieved on May 17, 2019] paragraph [2.4.3] paragraph [0001].

Nokia et al.: "On Enhanced UL Configured Grant Transmission for NR URLLC", 3GPP Draft; RI-1905147, 3rd Generation Partnership Project (3GPP), Mobile Competence Centre; 650, Route Des Lucioles; F-06921 Sophia-Antipolis Cedex; France, vol. RAN WGI, No. Xi 'an, China; Apr. 8, 2019-Apr. 12, 2019 Apr. 2, 2019 (Apr. 2, 2019), XP051707397, Retrieved from the Internet URL:http://www.3gpp.org/ftp/tsg%5Fran/WG1%5FRL1/TSGR1%5F96b/Docs/R1%2D1905147%2Ezip[retrieved on Apr. 2, 2019] p. 2-p. 4.

Ntt Docomo et al.: "Physical Layer Enhancements for NR URLLC", 3GPP Draft; RI-1809163 URLLC Layer 1 Enhancement, 3rd Generation Partnership Project (3GPP), Mobile Competence Centre; 650, Route Des Lucioles; F-06921 Sophia-Antipolis Cedex; France, vol. RAN WGI, No. Gothenburg, Sweden Aug. 20, 2018-Aug. 24, 2018 Aug. 11, 2018 (Aug. 11, 2018), XP051516533, Retrieved from the Internet URL:http://www.3gpp.org/ftp/tsg%5Fran/WG1%5FRL1/TSGR1%5F94/Docs/R1%2D1809163%2Ezip [retrieved on Aug. 11, 2018] paragraph [02.2]—paragraph [03.3); figures 1,3,4.

International Search Report and Written Opinion dated Aug. 28, 2020 from corresponding PCT Application No. PCT/US2020/033860.

* cited by examiner

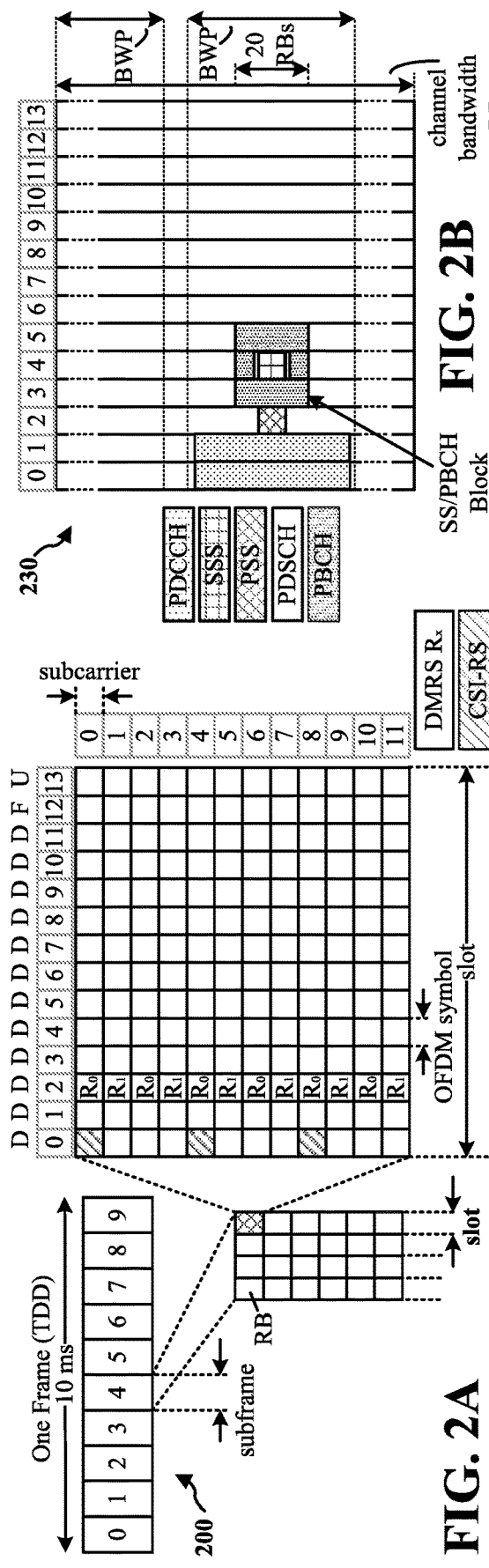
FIG. 2A
FIG. 2B
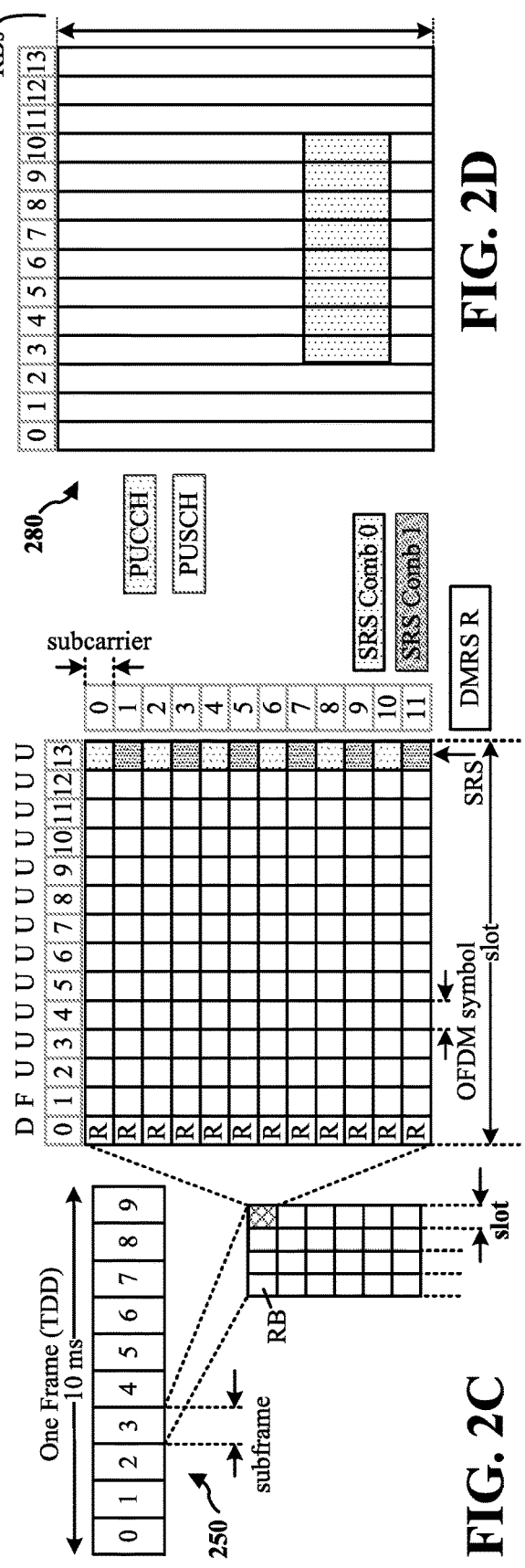
FIG. 2C
FIG. 2D

METHODS AND APPARATUS TO FACILITATE LAYER 1 CROSS-CARRIER REPETITION

CROSS REFERENCE TO RELATED APPLICATION(S)

This application claims the benefit of U.S. Provisional Patent Application Ser. No. 62/868,743, entitled "Methods and Apparatus to Facilitate Layer 1 Cross-Carrier Repetition" and filed on Jun. 28, 2019, which is expressly incorporated by reference herein in its entirety.

BACKGROUND

Technical Field

The present disclosure relates generally to communication systems, and more particularly, to wireless communication utilizing retransmissions of data transmissions.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In some examples, a data transmission received by a first device from a second device may not be properly received. For example, the first device may be unable to properly decode the received data transmission due to, for example, noise at the first device or the second device. In certain such examples when the first device is unable to properly decode the received data transmission, the first device may request that the second device retransmit the data transmission. To increase the likelihood of properly decoding the data transmission, the first device may combine the data transmission and the repetitions of the data transmission. That is, the combination of the data transmission and the repetitions (or retransmissions) of the data transmission may provide the first device enough information to properly decode the data transmission. Example techniques disclosed herein facilitate cross-carrier repetitions (or retransmissions).

In an aspect of the disclosure, a method, a computer-readable medium, and an apparatus are provided. An example apparatus for wireless communication determines a repetition configuration for semi-persistent scheduling (SPS) or a configured grant (CG) associated with a data transmission on a first entity and at least one repetition of the data transmission on a second entity. The example apparatus also receives the data transmission and the at least one repetition of the data transmission. Further, the example apparatus combines the data transmission and the at least one repetition of the data transmission to decode the data transmission.

In another aspect of the disclosure, a method, a computer-readable medium, and an apparatus are provided. An example apparatus for wireless communication determines a repetition configuration for an SPS or a CG associated with a data transmission on a first entity and at least one repetition of the data transmission on a second entity. The example apparatus also transmits the data transmission on the first entity. Further, the example apparatus transmits the at least one repetition of the data transmission on the second entity.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G NR frame, DL channels within a 5G NR subframe, a second 5G NR frame, and UL channels within a 5G NR subframe, respectively.

DETAILED DESCRIPTION

Figure 1:
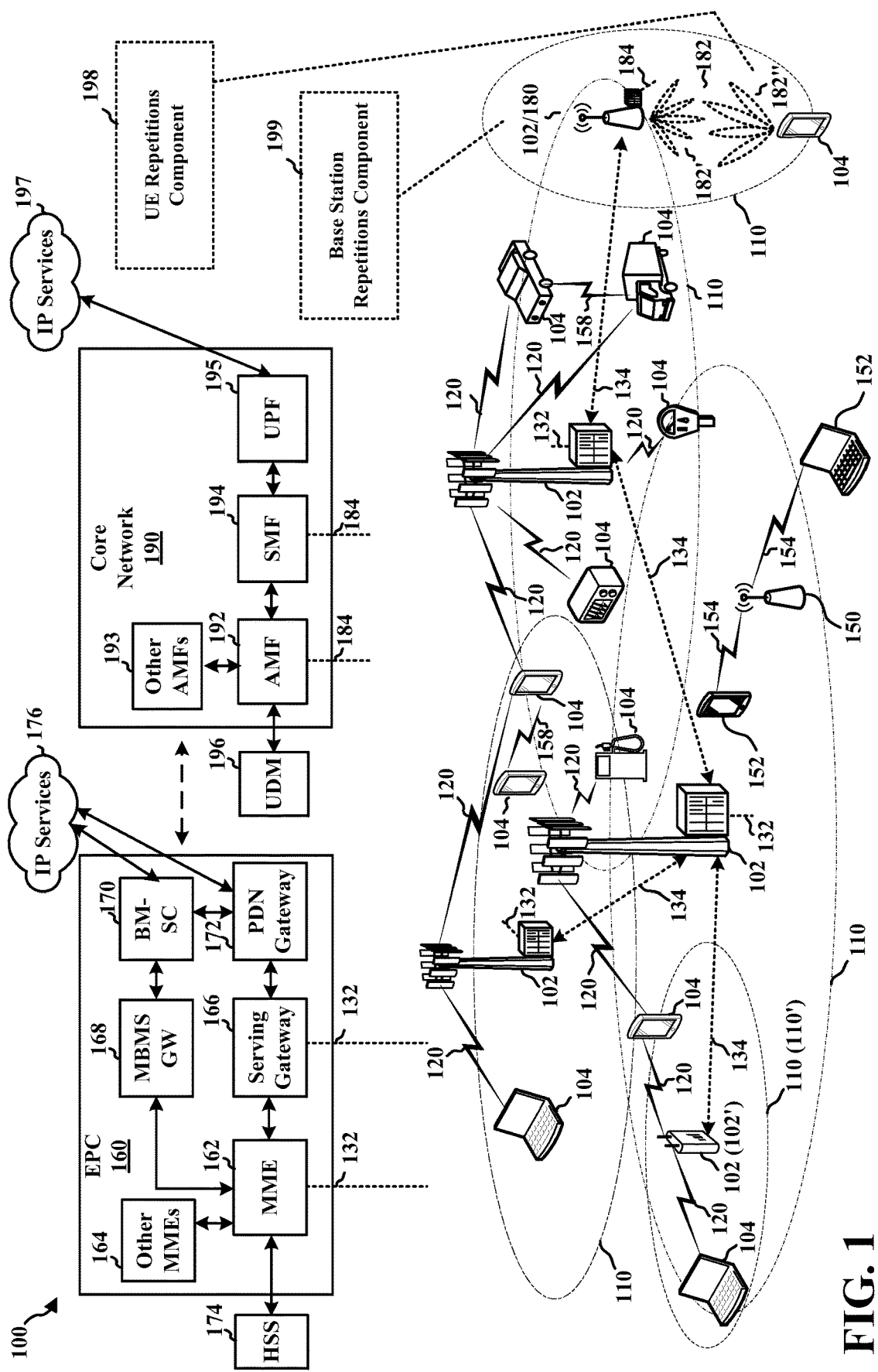
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

As used herein, the term computer-readable medium is expressly defined to include any type of computer readable storage device and/or storage disk and to exclude propagating signals and to exclude transmission media. As used herein, "computer-readable medium," "machine-readable medium," "computer-readable memory," and "machine-readable memory" are used interchangeably.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station.

Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Frequency range bands include frequency range 1 (FR1), which includes frequency bands below 7.225 GHz, and frequency range 2 (FR2), which includes frequency bands above 24.250 GHz. Communications using the mmW/near mmW radio frequency (RF) band (e.g., 3 GHz-300 GHz) has extremely high path loss and a short range. Base stations/UEs may operate within one or more frequency range bands. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to manage one or more aspects of wireless communication via cross-carrier retransmissions. As an example, in FIG. 1, the UE 104 may be configured to include a UE repetitions components 198 that is configured to determine a repetition configuration for semi-persistent scheduling or a configured grant associated with a data transmission on a first entity and at least one repetition of the data transmission on a second entity. The example UE repetitions components 198 may be configured to determine a repetition configuration for SPS or a CG associated with a data transmission on a first entity and at least one repetition of the data transmission on a second entity. The example UE repetitions components 198 may also be configured to receive the data transmission and the at least one repetition of the data transmission. Further, the example UE repetitions components 198 may be configured to combine the data transmission and the at least one repetition of the data transmission to decode the data transmission.

Still referring to FIG. 1, in certain aspects, the base station 102/180 may be configured to manage one or more aspects of wireless communication via cross-carrier retransmissions. As an example, in FIG. 1, the base station 102/180 may be configured to include a base station repetitions component 199 that is configured to determine a repetition configuration for SPS or a CG associated with a data transmission on a first entity and at least one repetition of the data transmission on a second entity. The example base station repetitions component 199 may also be configured to transmit the data transmission on the first entity. Additionally, the example base station repetitions component 199 may be configured to transmit the at least one repetition of the data transmission on the second entity.

Although the following description may provide examples based on SPS/CG transmissions, it may be appreciated that the concepts described herein may be applicable to other transmission types in which a data transmission may be retransmitted.

Furthermore, although the following description may be focused on 5G/NR, the concepts described herein may be applicable to other similar areas, such as LTE, LTE-A, CDMA, GSM, and/or other wireless technologies, in which a transmission may be retransmitted using cross-component carriers.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies µ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology µ there are 14 symbols/slot and $2^\mu$ slots/subframe. The subcarrier spacing and symbol length/duration are a function of the numerology. The subcarrier spacing may be equal to $2^\mu*15$ kHz, where µ is the numerology 0 to 4. As such, the numerology µ=0 has a subcarrier spacing of 15 kHz and the numerology µ=4 has a subcarrier spacing of 240 kHz. The symbol length/duration is inversely related to the subcarrier spacing. FIGS. 2A-2D provide an example of slot configuration 0 with 14 symbols per slot and numerology µ=2 with 4 slots per subframe. The slot duration is 0.25 ms, the subcarrier spacing is 60 kHz, and the symbol duration is approximately 16.67 µs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) ACK/NACK feedback. The PUSCH carries data, and may additionally be used to carry a buffer status report (BSR), a power headroom report (PHR), and/or UCI.

Figure 3:
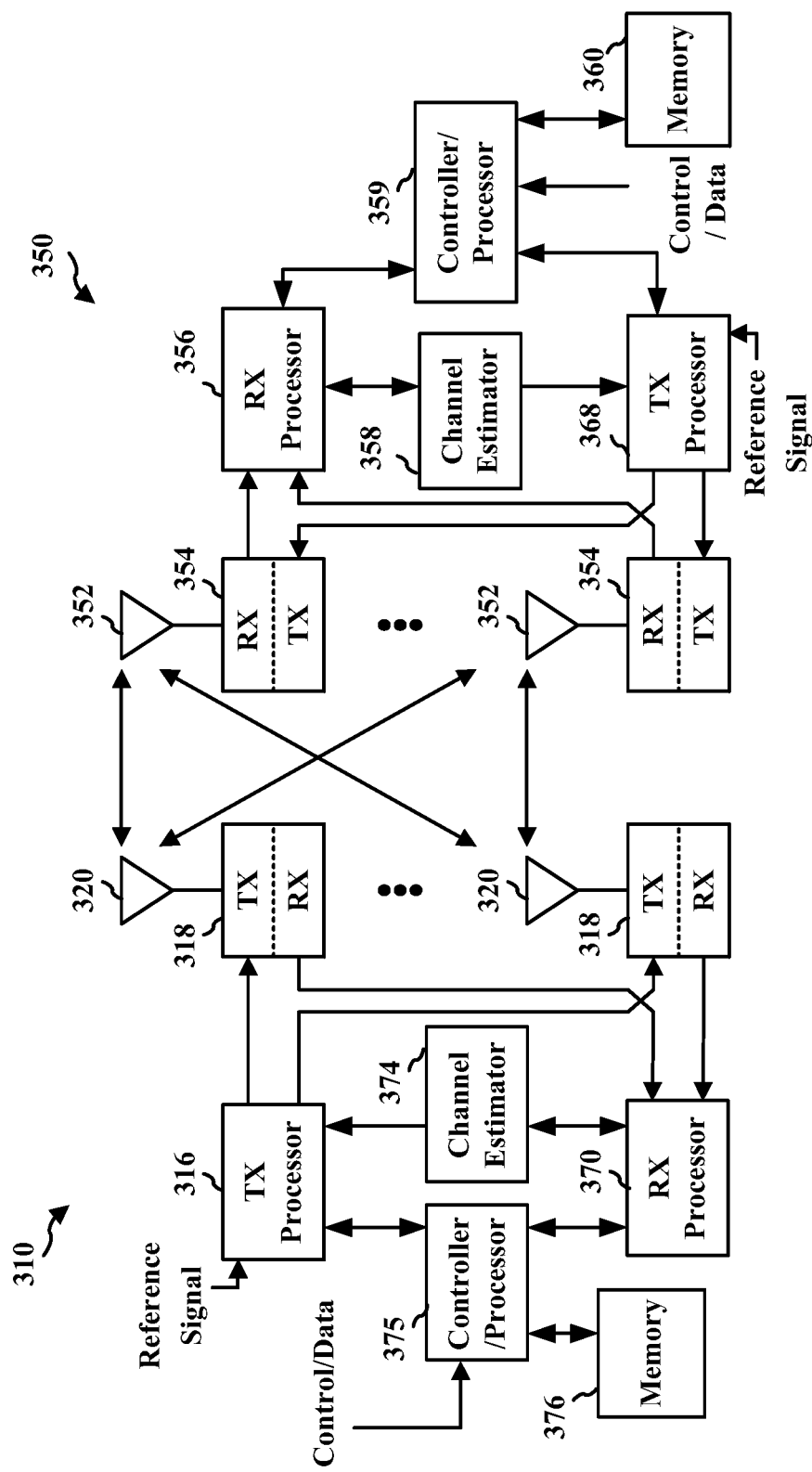
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the UE repetitions component 198 of FIG. 1.

At least one of the TX processor 316, the RX processor 370, and the controller/processor 375 may be configured to perform aspects in connection with the base station repetitions component 199 of FIG. 1.

In some examples, a data transmission received by a first device from a second device may not be properly received. For example, the first device may be unable to properly decode the received data transmission due to, for example, noise at the first device or the second device. In some such examples when the first device is unable to properly decode the received data transmission, the first device may request that the second device retransmit the data transmission. To increase the likelihood of properly decoding the data transmission, the first device may combine the data transmission and repetitions of the data transmission. That is, the combination of the data transmission and the repetitions (or retransmissions) of the data transmission may provide the first device enough information to properly decode the data transmission.

In some examples, the transmission and the retransmission(s) of the data transmission are performed within a cycle. In some such examples, if the first device is unable to properly decode the data transmission within that cycle, the data transmission is skipped and the next data transmission (if any) is processed.

However, if the cycle duration is relatively short (e.g., 0.5 ms), performing the retransmitting of the data transmission may not be possible and/or the likelihood of decoding the data transmission based on the received data transmissions and retransmissions may be reduced. In some examples, the first device and the second device may utilize SPS or a CG associated with the data transmission to improve the reliability (or likelihood) of decoding the data transmission.

In some examples, the reliability of decoding the data transmission may be further improved by utilizing higher layer PDCP duplication over different component carriers (CCs) (sometimes referred to as "cells").

Figure 4:
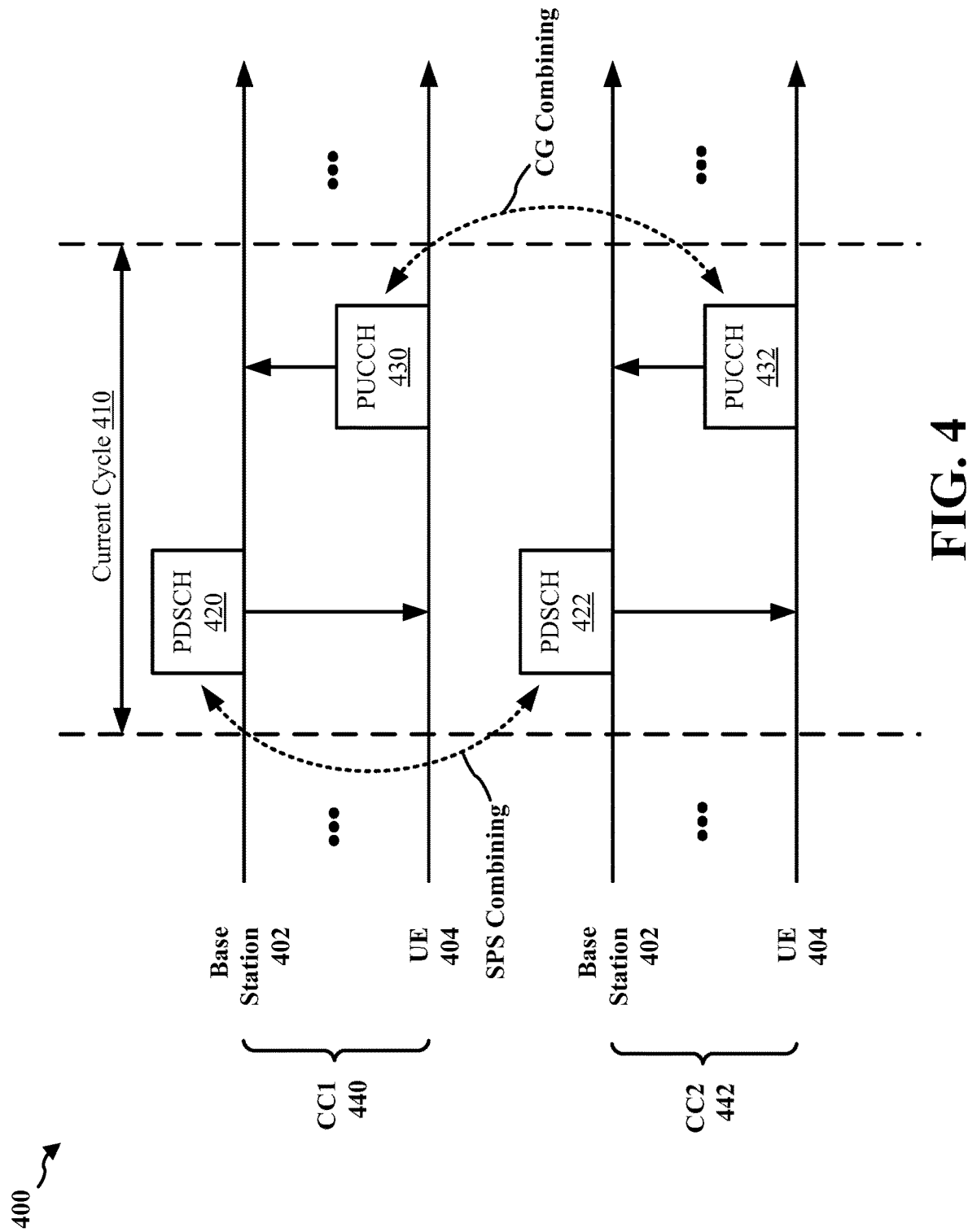
FIG. 4 illustrates an example communication flow between a base station and a UE within a current cycle, in accordance with the teachings disclosed herein.

FIG. 4 illustrates an example communication flow 400 between a base station 402 and a UE 404 within a current cycle 410. One or more aspects of the base station 402 may be implemented by the base station 102 of FIG. 1, the base station 180 of FIG. 1, and/or the base station 310 of FIG. 3. One or more aspects of the UE 404 may be implemented by the UE 104 of FIG. 1 and/or the UE 350 of FIG. 3. In the illustrated example of FIG. 4, the base station 402 transmits a data transmission 420 (e.g., PDSCH) to the UE 404 and the UE 404 transmits a control transmission 430 (e.g., PUCCH) to the base station 402.

For example, the base station 402 transmits a data transmission 420 to the UE 404 over a first component carrier (CC1) 440. The UE 404 may transmit a control transmission 430 to the base station 402 over the first CC 440 based on receiving the data transmission 420. The base station 402 may then transmit a duplicate of the data transmission 420 (e.g., a data retransmission 422 or a repetition) over a second component carrier (CC2) 442. The UE 404 may then transmit a duplicate of the control transmission 430 (e.g., a control retransmission 432 or a repetition) over the second CC 442. As shown in FIG. 4, the data transmissions 420, 422 may be associated with SPS and combined accordingly. Furthermore, the control transmissions 430, 432 may be associated with a CG and combined accordingly.

Examples disclosed herein utilize layer 1 (L1) cross-carrier repetition to further improve the reliability of decoding a transmission. For example, examples disclosed herein enable transmitting repetitions of SPS or CG transmissions on different CCs in FR2 (e.g., the 24.25 GHz to 52.6 GHz frequency range).

Example techniques disclosed herein facilitate signaling a repetition configuration from a first device (e.g., a base station) to a second device (e.g., a UE). The repetition configuration (sometimes referred to as an SPS/CG configuration) may indicate which CCs to use for transmitting or receiving repetitions. It may be appreciated that there may be multiple SPS/CG configurations per cell. A device transmitting repetitions may transmit the repetitions over the corresponding CCs. A device receiving repetitions may combine transmissions received over the corresponding CCs to facilitate decoding the transmission.

In some examples, the device receiving the repetitions may be a UE. In some such examples, the UE may generate an ACK/NACK signal for the received transmission and transmit the ACK/NACK signal to the base station. Examples disclosed herein facilitate the UE generating a common ACK/NACK signal based on whether the UE is able to properly decode the transmission (e.g., based on the incorrectly received transmission and/or the repetition(s) of the transmission). In some examples, the UE may transmit the common ACK/NACK signal for each received transmission or repetition. In some examples, the UE may transmit the common ACK/NACK signal for one of the repetitions.

Figure 5:
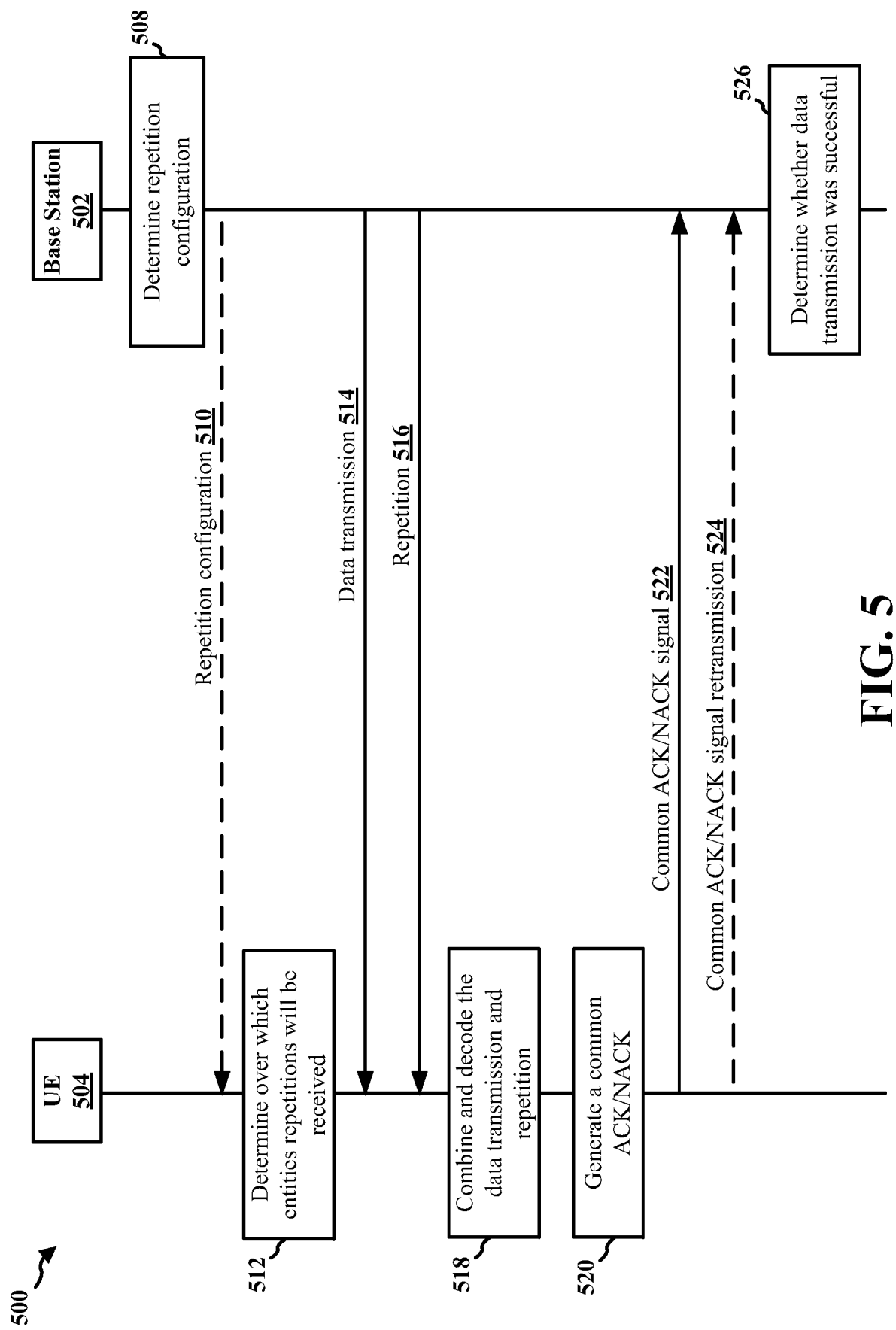
FIG. 5 illustrates an example wireless communication between a base station and a UE, in accordance with the teachings disclosed herein.

FIG. 5 illustrates an example wireless communication 500 between a base station 502 and a UE 504, as presented herein. In the illustrated wireless communication 500 of FIG. 5, the base station 502 transmits a data transmission and repetition(s) of the data transmission to the UE 504. One or more aspects of the base station 502 may be implemented by the base station 102 of FIG. 1, the base station 180 of FIG. 1, the base station 310 of FIG. 3, and/or the base station 402 of FIG. 4. One or more aspects of the UE 504 may be implemented by the UE 104 of FIG. 1, the UE 350 of FIG. 3, and/or the UE 404 of FIG. 4.

While the wireless communication 500 includes one base station 502 in communication with one UE 504, in additional or alternative examples, the base station 502 may be in communication with any suitable quantity of UEs 504 and/or base stations 502, and/or the UE 504 may be in communication with any suitable quantity of base stations 502 and/or UEs 504.

In the illustrated example, at 508, the base station 502 may determine a repetition configuration 510. The repetition configuration 510 may be associated with an SPS configuration or a CG configuration. The repetition configuration 510 may be associated with a data transmission on a first entity and at least one repetition of the data transmission on a second entity.

The base station 502 may transmit the repetition configuration 510 that is received by the UE 504. The repetition configuration 510 may be associated with an SPS configuration or a CG configuration associated with a data transmission on a first entity and at least one repetition of the data transmission on a second entity.

At 512, the UE 504 may determine over which entities any repetitions may be received based on the repetition configuration 510. For example, the UE 504 may determine, based on the repetition configuration 510, that a first repetition occurrence may occur over a first entity and a second repetition occurrence may occur over a second entity. In some examples, the first entity and the second entity may comprise frequency resource(s). In some examples, the first entity and the second entity may comprise component carrier(s) (CCs) (or cells).

In the illustrated example of FIG. 5, the base station 502 transmits a data transmission 514 that is received by the UE 504. For example, the base station 502 may transmit the data transmission 514 via a PDSCH. The base station 502 may then transmit a repetition 516 of the data transmission. For example, the base station 502 may transmit the repetition 516 via an entity indicated via the repetition configuration 510. Although the example of FIG. 5 illustrates one example repetition 516, it may be appreciated that in other examples, the repetition 516 may be implemented by one or more repetitions of the data transmission 514. Aspects of the data transmission 514 may be implemented by the data transmission 420 of FIG. 4. Aspects of the repetition 516 may be implemented by the data retransmission 422 of FIG. 4.

At 518, the UE 504 may combine and decode the received data transmission 514 and the received repetition(s) 516 of the data transmission. In some examples, the UE 504 may combine the one or more repetitions associated with and received during a same cycle.

At 520, the UE 504 may generate a common ACK/NACK based on whether the UE 504 was able to properly decode the data transmission (e.g., based on the data transmission 514 and/or the repetition(s) 516). The UE 504 may then transmit the common ACK/NACK signal 522 that is received by the base station 502. For example, the UE 504 may transmit the common ACK/NACK signal 522 via an uplink control channel associated with the data transmission 514. In some examples, the UE 504 may also retransmit the common ACK/NACK signal (e.g., a common ACK/NACK signal retransmission) 524. For example, the UE 504 may retransmit the common ACK/NACK signal retransmission 524 via an uplink control channel associated with each repetition 516.

At 526, the base station 502 may determine whether the transmission of the data transmission was successful based on the received common ACK/NACK signal(s) 522, 524. In some examples, the base station 502 may determine that the transmission of the data transmission was successful if at least one common ACK/NACK signal is an ACK (e.g., the common ACK/NACK signal 522 is an ACK and/or at least one of the common ACK/NACK signal retransmission(s) 425 is an ACK).

In some examples, the base station 502 may transmit the repetition configuration 510 via RRC signaling, via DCI signaling, and/or via a MAC-control element (MAC-CE). In some examples, the repetition configuration 510 may include an identifier associated with the repetition configuration. In some examples, the repetition configuration 510 may include a cycle identifier.

In some examples, the repetition configuration 510 may correspond to an entity, such as a frequency resource or a component carrier (CC). For example, the repetition configuration 510 may indicate over which CC a repetition may be received and/or over which CC to transmit a repetition.

In some examples, the repetition configuration 510 may include a set of repetition configurations. In some examples, the set of repetition configurations may be associated with a same cycle (or period) having a common start boundary. In some examples, the common start boundary may be determined based on a common frame boundary, such as SFN=0. In some examples, the common start boundary may be configured via DCI signaling.

In some examples, the UE 504 may determine, at 512, that the repetition occurrences may occur over a subset of HARQ processes. For example, the repetition configuration 510 may indicate that the repetition occurrences occur for certain HARQ process identifiers. In some such examples, the UE 504 may perform the combining and decoding of the repetitions for the corresponding HARQ process identifiers.

Although only a single repetition is described in connection with the example of FIG. 5 in order to illustrate the principle of L1 cross-carrier repetitions, it may be appreciated that the principle can be extended to any number of repetitions.

Figure 6:
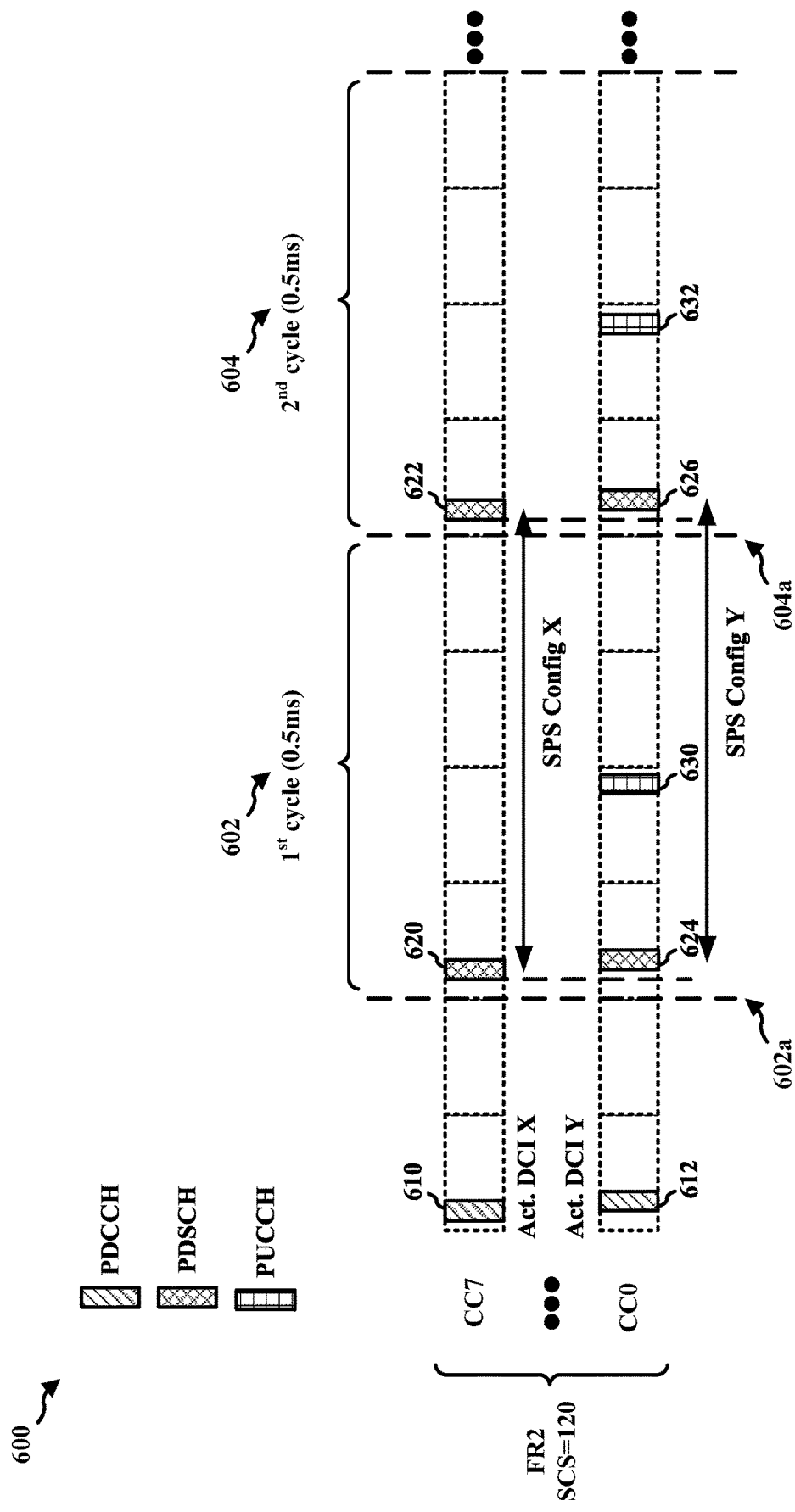
FIG. 6 illustrates an example timing diagram of an apparatus receiving downlink transmissions and transmitting uplink transmissions, in accordance with the teachings disclosed herein.

FIG. 6 illustrates an example timing diagram 600 of an apparatus receiving downlink transmissions and transmitting uplink transmissions. The example apparatus may be a UE, such as the example UE 104, the UE 350, the UE 404, and/or the UE 504. The example timing diagram 600 includes a first component carrier (CC7) and a second component carrier (CC0). However, other examples may include any suitable quantity of component carriers.

The example timing diagram 600 also includes a first cycle 602 and a second cycle 604. The start of the first cycle 602 may be defined by a first common start boundary 602a. The start of the second cycle 604 may be defined by a second common start boundary 604a. The common start boundaries 602a, 604a may be determined based on a common frame boundary (e.g., SFN=0) and/or via DCI signaling. In the illustrated example of FIG. 6, the cycles 602, 604 have a duration of 0.5 ms. However, other examples may utilize any suitable cycle duration.

In the illustrated timing diagram 600, the apparatus receives a first downlink control transmission 610 (e.g., PDCCH) over the first component carrier (CC7). The apparatus also receives a second downlink control transmission 612 (e.g., PDCCH) over the second component carrier (CC0). In the illustrated example, the downlink control transmissions 610, 612 provide repetition configurations for the corresponding component carriers. For example, the first downlink control transmission 610 may indicate that an "X" SPS configuration (e.g., SPS configuration X) is activated for the first component carrier (CC7), while the second downlink control transmission 612 may indicate that a "Y" SPS configuration (e.g., SPS configuration Y) is activated for the second component carrier (CC0). Aspects of the downlink control transmissions 610, 612 may be implemented by the repetition configuration 510 of FIG. 5.

In the illustrated example, the SPS configuration X may indicate that a first repetition 620 of a first data transmission may be received over the first component carrier (CC7) during the first cycle 602 and that a second repetition 622 of a second data transmission may be received over the first component carrier (CC7) during the second cycle 604.

In the illustrated example, the SPS configuration Y may indicate that a third repetition 624 of the first data transmission may be received over the second component carrier (CC0) during the first cycle 602 and that a fourth repetition 626 of the second data transmission may be received over the second component carrier (CC0) during the second cycle 604. The example SPS configuration Y may also indicate that the UE is to transmit a first uplink control transmission 630 during the first cycle 602 and to transmit a second uplink control transmission 632 during the second cycle 604.

In the illustrated example, the apparatus receives the first repetition 620 earlier than the third repetition 624 during the first cycle 602. Similarly, the apparatus receives the second repetition 622 earlier than the fourth repetition 626 during the second cycle 604.

In the illustrated example, the apparatus may combine the transmissions and/or repetitions received during the same cycle. For example, for the first cycle 602, the apparatus may combine the first repetition 620 received over the first component carrier (CC7) and the third repetition 624 received over the second component carrier (CC0). For the second cycle 604, the apparatus may combine the second repetition 622 received over the first component carrier (CC7) and the fourth repetition 626 received over the second component carrier (CC0). The apparatus may then attempt to decode the respective combinations and generate a common ACK/NACK signal for the respective cycles 602, 604. For example, the apparatus may transmit a first common ACK/NACK signal associated with the first cycle 602 using the first uplink control transmission 630 (e.g., PUCCH). The apparatus may also transmit a second common ACK/NACK signal associated with the second cycle 604 using the second uplink control transmission 632 (e.g., PUCCH).

Thus, as shown in FIG. 6, the apparatus is able to link repetitions of data transmissions across component carriers for a configuration.

Figure 7:
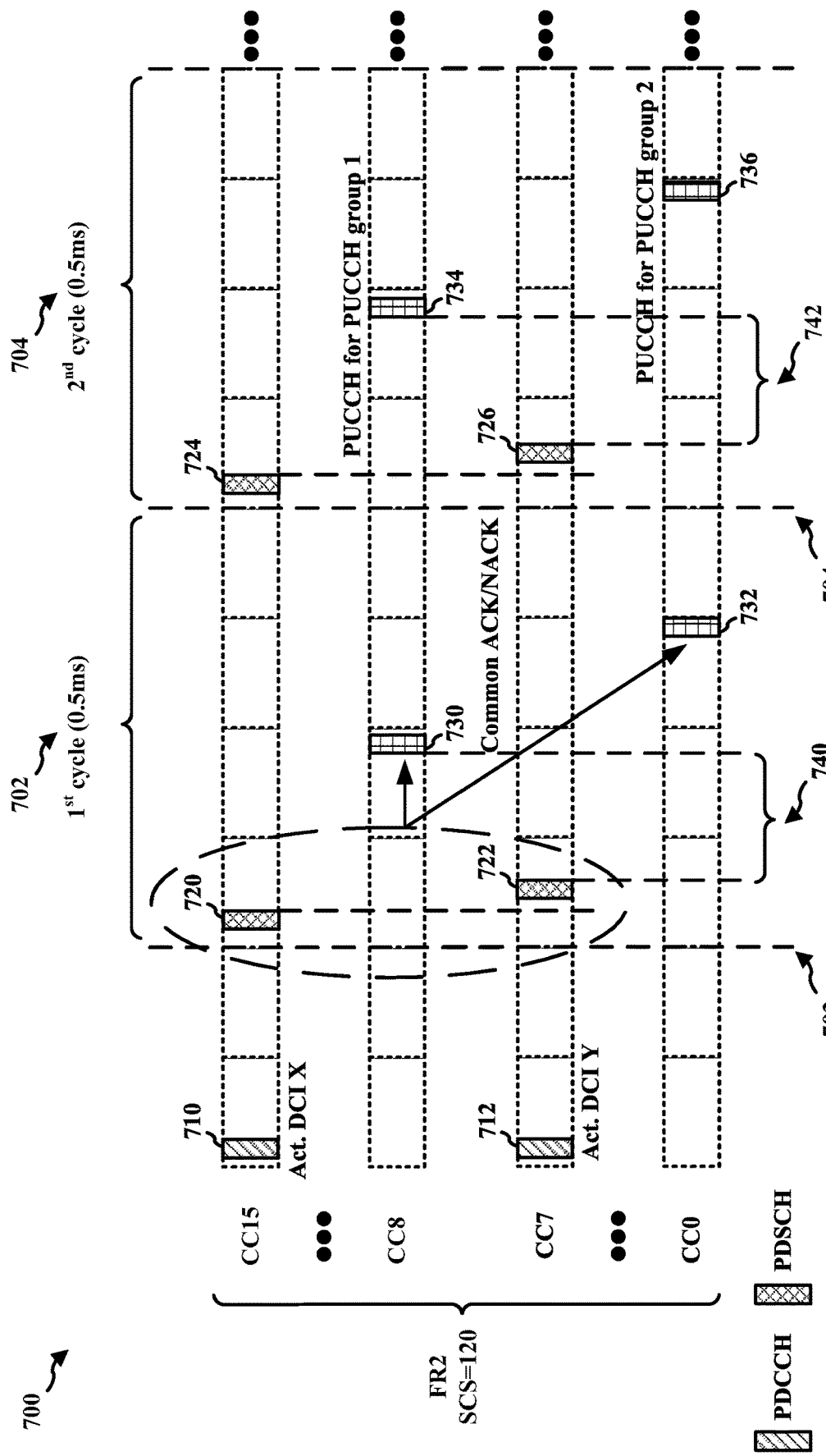
FIG. 7 illustrates an example timing diagram of an apparatus receiving downlink transmissions and transmitting a common ACK/NACK signal for each received repetition, in accordance with the teachings disclosed herein.

FIG. 7 illustrates an example timing diagram 700 of an apparatus receiving downlink transmissions and transmitting a common ACK/NACK signal for each received repetition. For example, the apparatus may combine repetitions of a data transmission received during a cycle to generate a common ACK/NACK signal and then transmit the common ACK/NACK signal via uplink control channels associated with each data transmission repetition.

The example apparatus may be a UE, such as the example UE 104, the UE 350, the UE 404, and/or the UE 504. The example timing diagram 700 includes a first component carrier (CC15), a second component carrier (CC8), a third component carrier (CC7), and a fourth component carrier (CC0). In the illustrated example, the second component carrier (CC8) may be used to transmit uplink control transmissions associated with downlink data transmissions received via the first component carrier (CC15). The fourth component carrier (CC0) may be used to transmit uplink control transmissions associated with downlink data transmissions received via the third component carrier (CC7).

The example timing diagram 700 also includes a first cycle 702 and a second cycle 704. The start of the first cycle 702 may be defined by a first common start boundary 702a. The start of the second cycle 704 may be defined by a second common start boundary 704a. The common start boundaries 702a, 704a may be determined based on a common frame boundary (e.g., SFN=0) and/or via DCI signaling. In the illustrated example, the cycles 702, 704 are associated with the transmission of respective data transmissions. For example, repetitions of a first data transmission may be received during the first cycle 702, while repetitions of a second data transmission may be received during the second cycle 704. In the illustrated example, the cycles 702, 704 have a duration of 0.5 ms. However, other examples may utilize any suitable cycle duration.

In the illustrated timing diagram 700, the apparatus receives a first downlink control transmission 710 (e.g., PDCCH) over the first component carrier (CC15). The apparatus also receives a second downlink control transmission 712 (e.g., PDCCH) over the third component carrier (CC7). In the illustrated example, the downlink control transmissions 710, 712 provide repetition configurations for the corresponding component carriers. For example, the first downlink control transmission 710 may activate the SPS configuration X for the first component carrier (CC15), while the second downlink control transmission 712 may activate the SPS configuration Y for the third component carrier (CC7). Aspects of the downlink control transmissions 710, 712 may be implemented by the repetition configuration 510 of FIG. 5.

In the illustrated example, during the first cycle 702, the apparatus receives a first repetition 720 (e.g., PDSCH) of the first data transmission over the first component carrier (CC15) and a second repetition 722 (e.g., PDSCH) of the first data transmission over the third component carrier (CC7). During the second cycle 704, the apparatus receives a third repetition 724 (e.g., PDSCH) of the second data transmission over the first component carrier (CC15) and a fourth repetition 726 (e.g., PDSCH) of the second data transmission over the third component carrier (CC7).

In the illustrated example, the apparatus receives the first repetition 720 earlier than the second repetition 722 during the first cycle 702. Similarly, the apparatus receives the third repetition 724 earlier than the fourth repetition 726 during the second cycle 704.

In the illustrated example, the apparatus combines repetitions of data transmissions received during a same cycle to generate a common ACK/NACK signal associated with the respective data transmission. For example, the apparatus may combine the first repetition 720 and the second repetition 722 received during the first cycle 702 and attempt to decode the corresponding first data transmission. The apparatus may then generate an ACK/NACK signal that is the same for the repetitions 720, 722 (e.g., a common ACK/NACK signal) based on whether the apparatus was able to properly decode the first data transmission. In the illustrated example, the apparatus transmits the common ACK/NACK signal in the corresponding uplink control channel associated with each repetition. For example, the apparatus may transmit the common ACK/NACK signal associated with the first cycle 702 via a first uplink control transmission 730 (e.g., PUCCH) over the second component carrier (CC8) corresponding to the first repetition 720. The apparatus may also transmit the common ACK/NACK signal associated with the first cycle 702 via a second uplink control transmission 732 (e.g., PUCCH) over the fourth component carrier (CC0) corresponding to the second repetition 722. In the illustrated example, the apparatus transmits the first uplink control transmission 730 earlier than the second uplink control transmission 732 during the first cycle 702.

Similarly, with respect to the second cycle 704, the apparatus may combine the third repetition 724 and the fourth repetition 726 received during the second cycle 704 and attempt to decode the corresponding second data transmission. The apparatus may then generate an ACK/NACK signal that is the same for the repetitions 724, 726 (e.g., a common ACK/NACK signal) based on whether the apparatus was able to properly decode the second data transmission. In the illustrated example, the apparatus may transmit the common ACK/NACK signal associated with the second cycle 704 via a third uplink control transmission 734 (e.g., PUCCH) over the second component carrier (CC8) corresponding to the third repetition 724. The apparatus may also transmit the common ACK/NACK signal associated with the second cycle 704 via a fourth uplink control transmission 736 (e.g., PUCCH) over the fourth component carrier (CC0) corresponding to the fourth repetition 726. In the illustrated example, the apparatus transmits the third uplink control transmission 734 earlier than the fourth uplink control transmission 736 during the second cycle 704.

In some examples, for each repetition, the common ACK/NACK signal has a bit location in a corresponding codebook determined by the repetition occurrence. In some examples, the bit location of the common ACK/NACK signal depends on a temporal distance between the repetition and the uplink control channel. For example, the first uplink control transmission 730 may have a first bit location carried by an uplink control channel associated with the first repetition 720, the second uplink control transmission 732 may have a second bit location carried by an uplink control channel associated with the second repetition 722, the third uplink control transmission 734 may have a third bit location carried by an uplink control channel associated with the third repetition 724, and the fourth uplink control transmission 736 may have a fourth bit location carried by an uplink control channel associated with the fourth repetition 726.

In some examples, a distance threshold may provide a temporal distance between the earliest transmitting of the common ACK/NACK signal and the receiving of the last repetition of the data transmission. In some examples, the distance threshold corresponds to a duration within a cycle before the earliest common ACK/NACK signal may be transmitted. In some such examples, the distance threshold may provide a sufficient temporal distance to enable the repetitions associated with the cycle to be received before the apparatus performs the combining and attempted decoding of the data transmission.

For example, in the illustrated example of FIG. 7, the first cycle 702 includes a first distance threshold 740 and the second cycle 704 includes a second distance threshold 742. The first distance threshold 740 may provide a sufficient temporal distance between the receiving of the second repetition 722 (e.g., the last repetition of the first cycle 702) and the transmitting of the first uplink control transmission 730 (e.g., the earliest transmission of the common ACK/NACK signal of the first cycle 702). Similarly, the second distance threshold 742 may provide a sufficient temporal distance between the receiving of the fourth repetition 726 (e.g., the last repetition of the second cycle 704) and the transmitting of the third uplink control transmission 734 (e.g., the earliest transmission of the common ACK/NACK signal of the second cycle 704). Thus, it may be appreciated that the distance threshold may prevent the apparatus from attempting to generate and transmit a common ACK/NACK signal prior to receiving each of the repetitions associated with the respective cycle.

Figure 8:
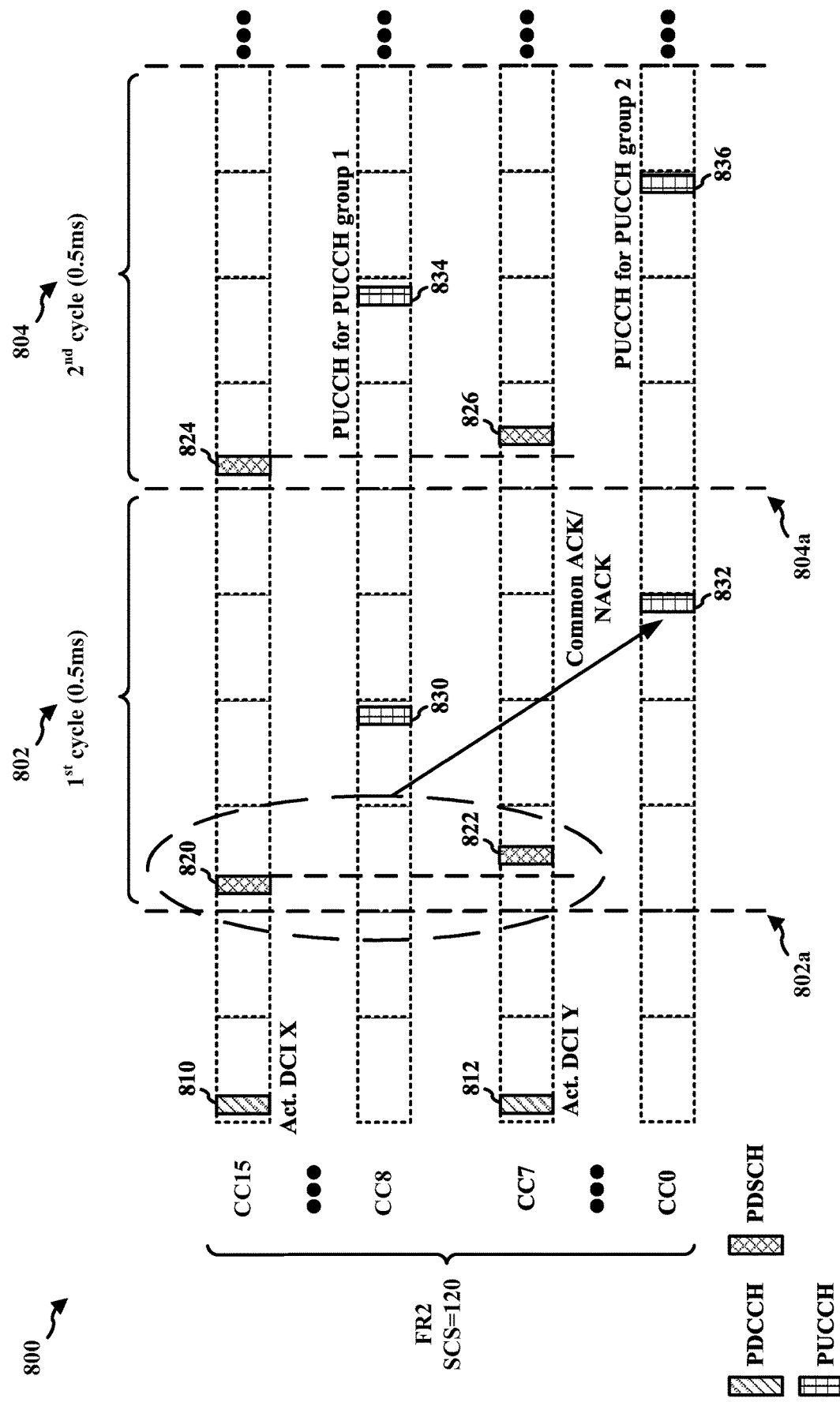
FIG. 8 illustrates an example timing diagram of an apparatus receiving downlink transmissions and transmitting a common ACK/NACK signal based on a rule, in accordance with the teachings disclosed herein.

FIG. 8 illustrates an example timing diagram 800 of an apparatus receiving downlink transmissions and transmitting a common ACK/NACK signal based on a rule. For example, the apparatus may combine repetitions of a data transmission received during a cycle to generate a common ACK/NACK signal and then transmit the common ACK/NACK signal via an uplink control channel associated with a last received data transmission repetition.

The example apparatus may be a UE, such as the example UE 104, the UE 350, the UE 404, and/or the UE 504. The example timing diagram 800 includes a first component carrier (CC15), a second component carrier (CC8), a third component carrier (CC7), and a fourth component carrier (CC0). In the illustrated example, the second component carrier (CC8) may be used to transmit uplink control transmissions 830, 834 (e.g., PUCCH) associated with downlink data transmissions, such as downlink data transmissions 820, 824 (e.g., PDSCH), received via the first component carrier (CC15). The fourth component carrier (CC0) may be used to transmit uplink control transmissions 832, 836 (e.g., PUCCH) associated with downlink data transmissions, such as downlink data transmissions 822, 826 (e.g., PDSCH), received via the third component carrier (CC7).

The example timing diagram 800 also includes a first cycle 802 and a second cycle 804. The start of the first cycle 802 may be defined by a first common start boundary 802a. The start of the second cycle 804 may be defined by a second common start boundary 804a. The common start boundaries 802a, 804a may be determined based on a common frame boundary (e.g., SFN=0) and/or via DCI signaling. In the illustrated example, the cycles 802, 804 are associated with the transmission of respective data transmissions. For example, repetitions of a first data transmission may be received during the first cycle 802, while repetitions of a second data transmission may be received during the second cycle 804. In the illustrated example, the cycles 802, 804 have a duration of 0.5 ms. However, other examples may utilize any suitable cycle duration.

In the illustrated timing diagram 800, the apparatus receives a first downlink control transmission 810 (e.g., PDCCH) over the first component carrier (CC15). The apparatus also receives a second downlink control transmission 812 (e.g., PDCCH) over the third component carrier (CC7). In the illustrated example, the downlink control transmissions 810, 812 provide repetition configurations for the corresponding component carriers. For example, the first downlink control transmission 810 may activate the SPS configuration X for the first component carrier (CC15), while the second downlink control transmission 812 may activate the SPS configuration Y for the third component carrier (CC7). Aspects of the downlink control transmissions 810, 812 may be implemented by the repetition configuration 510 of FIG. 5.

In the illustrated example of FIG. 8, during the first cycle 802, the apparatus receives a first repetition 820 (e.g., PDSCH) of the first data transmission over the first component carrier (CC15) and a second repetition 822 (e.g., PDSCH) of the first data transmission over the third component carrier (CC7). During the second cycle 804, the apparatus receives a third repetition 824 (e.g., PDSCH) of the second data transmission over the first component carrier (CC15) and a fourth repetition 826 (e.g., PDSCH) of the second data transmission over the third component carrier (CC7).

In the illustrated example, the apparatus receives the first repetition 820 earlier than the second repetition 822 during the first cycle 802. Similarly, the apparatus receives the third repetition 824 earlier than the fourth repetition 826 during the second cycle 804.

In the illustrated example, the apparatus combines repetitions of data transmissions received during a same cycle to generate a common ACK/NACK signal associated with the respective data transmission. For example, the apparatus may combine the first repetition 820 and the second repetition 822 received during the first cycle 802 and attempt to decode the corresponding first data transmission. The apparatus may then generate an ACK/NACK signal that is the same for the repetitions 820, 822 (e.g., a common ACK/NACK signal) based on whether the apparatus was able to properly decode the first data transmission.

Similarly, with respect to the second cycle 804, the apparatus may combine the third repetition 824 and the fourth repetition 826 received during the second cycle 804 and attempt to decode the corresponding second data transmission. The apparatus may then generate an ACK/NACK signal that is the same for the repetitions 824, 826 (e.g., a common ACK/NACK signal) based on whether the apparatus was able to properly decode the second data transmission.

In the illustrated example, the apparatus may then transmit the common ACK/NACK signal based on a rule. In some examples, the rule may be provided via a downlink control transmission (e.g., the downlink control transmissions 810, 812). In the illustrated example, the rule configures the apparatus to transmit the common ACK/NACK signal using an uplink control transmission associated with a last repetition of a cycle.

For example, with respect to the first cycle 802, the apparatus receives the first repetition 820 earlier than the second repetition 822 and, thus, the second repetition 822 is the last repetition received during the first cycle 802. Accordingly, the apparatus may transmit the common ACK/NACK signal associated with a first data transmission using an uplink control transmission 832 (e.g., PUCCH) associated with the second repetition 822.

Similarly, with respect to the second cycle 804, the apparatus receives the third repetition 824 earlier than the fourth repetition 826 and, thus, the fourth repetition 826 is the last repetition received during the second cycle 804. Accordingly, the apparatus may transmit the common ACK/NACK signal associated with the second data transmission using an uplink control transmission 836 (e.g., PUCCH) associated with the fourth repetition 826.

It may be appreciated that while the above example includes a rule that configures the apparatus to transmit the common ACK/NACK signal using an uplink control transmission associated with a last repetition of a cycle, in additional or alternative examples, other rules may be used to determine when and/or where to transmit the common ACK/NACK signal. For example, the rule may cause the apparatus to transmit the common ACK/NACK signal for each repetition (as described above in connection with the timing diagram 700 of FIG. 7).

Figure 9:
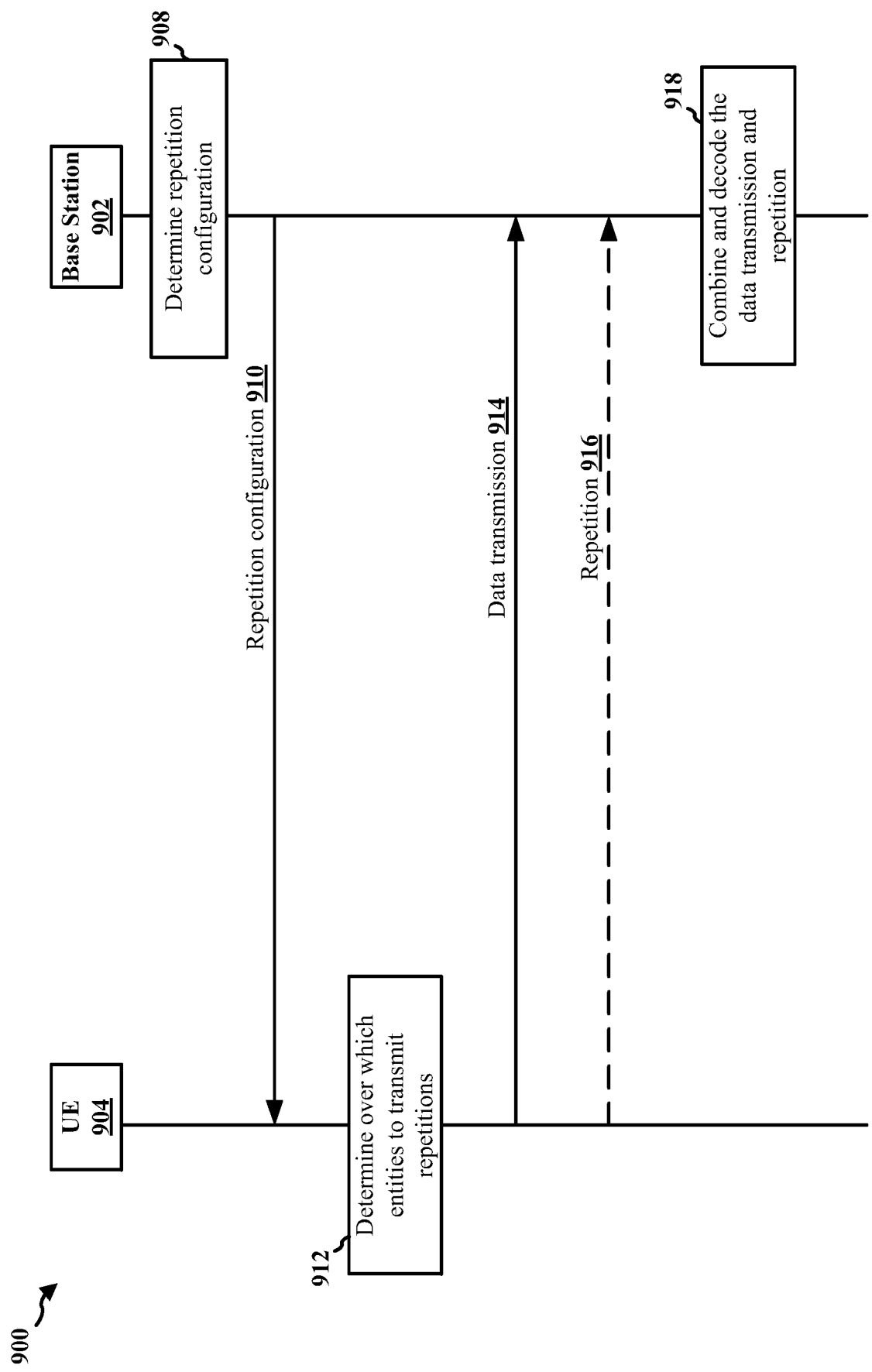
FIG. 9 illustrates an example wireless communication between a base station and a UE, in accordance with the teachings disclosed herein.

FIG. 9 illustrates an example wireless communication 900 between a base station 902 and a UE 904, as presented herein. In the illustrated wireless communication 900 of FIG. 9, the UE 904 transmits a data transmission and repetition(s) of the data transmission to the base station 902. One or more aspects of the base station 902 may be implemented by the base station 102 of FIG. 1, the base station 180 of FIG. 1, the base station 310 of FIG. 3, the base station 402 of FIG. 4, and/or the base station 502 of FIG. 5. One or more aspects of the UE 904 may be implemented by the UE 104 of FIG. 1, the UE 350 of FIG. 3, the UE 404 of FIG. 4, and/or the UE 504 of FIG. 5.

It may be appreciated that while the wireless communication 900 includes one base station 902 in communication with one UE 904, in additional or alternative examples, the base station 902 may be in communication with any suitable quantity of UEs 904 and/or base stations 902, and/or the UE 904 may be in communication with any suitable quantity of base stations 902 and/or UEs 904.

In the illustrated example, at 908, the base station 902 may determine a repetition configuration 910. The repetition configuration 910 may be associated with an SPS configuration or a CG configuration. The repetition configuration 910 may be associated with a data transmission on a first entity and at least one repetition of the data transmission on a second entity.

The base station 902 may transmit the repetition configuration 910 that is received by the UE 904. The repetition configuration 910 may be associated with an SPS configuration or a CG configuration associated with a data transmission on a first entity and at least one repetition of the data transmission on a second entity.

At 912, the UE 904 may determine over which entities to transmit repetitions of a data transmission based on the repetition configuration 910. For example, the UE 904 may determine, based on the repetition configuration 910, to transmit a first repetition over a first entity and to transmit a second repetition over a second entity. In some examples, the first entity and the second entity may comprise frequency resource(s). In some examples, the first entity and the second entity may comprise component carrier(s) (CCs) (or cells).

The UE 904 may then transmit a data transmission 914. For example, the UE 904 may transmit the data transmission 914 via PUSCH. The UE 904 may then transmit a duplicate of the data transmission 914 (e.g., a data repetition 916). For example, the UE 904 may transmit the repetition 916 using an entity indicated by the repetition configuration 910. Although the example of FIG. 9 illustrates one example repetition 916, it may be appreciated that in other examples, the repetition 916 may be implemented by one or more repetitions of the data transmission 914. Aspects of the data transmission 914 may be implemented by the control transmission 430 of FIG. 4. Aspects of the repetition 916 may be implemented by the control retransmission 432 of FIG. 4.

At 918, the base station 902 may combine and decode the data transmission 914 and the repetition(s) 916 of the data transmission. In some examples, the base station 902 may combine the one or more repetitions associated with and received during the same cycle.

In some examples, the base station 902 may transmit the repetition configuration 910 via RRC signaling, via DCI signaling, and/or via a MAC-CE. In some examples, the repetition configuration 910 may include an identifier associated with the repetition configuration. In some examples, the repetition configuration 910 may include a cycle identifier.

In some examples, the repetition configuration 910 may correspond to an entity, such as a frequency resource or a component carrier (CC). For example, the repetition configuration 910 may indicate over which CC a repetition may be received and/or over which CC to transmit a repetition.

In some examples, the repetition configuration 910 may include a set of repetition configurations. In some examples, the set of repetition configurations may be associated with a same cycle (or period) having a common start boundary. In some examples, the common start boundary may be determined based on a common frame boundary, such as SFN=0. In some examples, the common start boundary may be configured via DCI signaling.

In some examples, the UE 904 may determine, at 912, to transmit a same transport block (TB) or control block group (CBG) on uplink data transmissions using different entities. For example, based on the repetition configuration 910, the UE 904 may determine to transmit a first repetition using a first uplink data transmission over a first entity, and may determine to transmit a second repetition using second uplink data transmission over a second entity.

Although only a single repetition is described in connection with the example of FIG. 9 in order to illustrate the principle of L1 cross-carrier repetitions, it may be appreciated that the principle can be extended to any number of repetitions.

Figure 10:
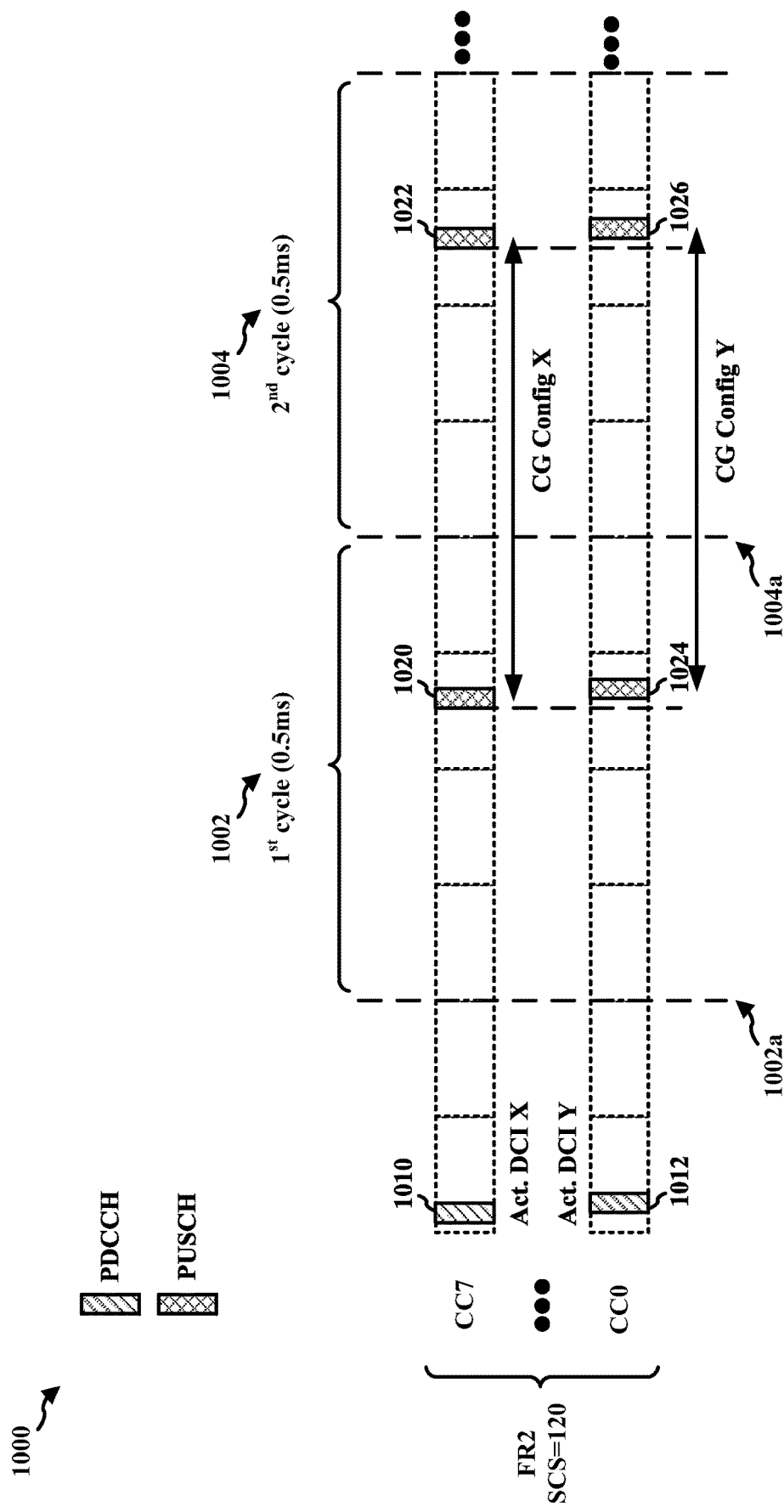
FIG. 10 illustrates an example timing diagram of an apparatus receiving downlink transmissions and transmitting uplink transmissions, in accordance with the teachings disclosed herein.

FIG. 10 illustrates an example timing diagram 1000 of an apparatus receiving downlink transmissions and transmitting uplink transmissions. The example apparatus may be a UE, such as the example UE 104, the UE 350, the UE 404, the UE 504, and/or the UE 904. The example timing diagram 1000 includes a first component carrier (CC7) and a second component carrier (CC0).

The example timing diagram 1000 also includes a first cycle 1002 and a second cycle 1004. In the illustrated example, the first cycle 1002 may be associated with a first data transmission and the second cycle 1004 may be associated with a second data transmission. The start of the first cycle 1002 may be defined by a first common start boundary 1002a. The start of the second cycle 1004 may be defined by a second common start boundary 1004a. The common start boundaries 1002a, 1004a may be determined based on a common frame boundary (e.g., SFN=0) and/or via DCI signaling. In the illustrated example, the cycles 1002, 1004 have a duration of 0.5 ms. However, other examples may utilize any suitable cycle duration.

In the illustrated timing diagram 1000, the apparatus receives a first downlink control transmission 1010 (e.g., PDCCH) over the first component carrier (CC7). The apparatus also receives a second downlink control transmission 1012 (e.g., PDCCH) over the second component carrier (CC0). In the illustrated example, the downlink control transmissions 1010, 1012 provide repetition configurations for the corresponding component carriers. For example, the first downlink control transmission 1010 may indicate that an "X" CG configuration (e.g., CG configuration X" is activated for the first component carrier (CC7), while the second downlink control transmission 1012 may indicate that a "Y" CG configuration (e.g., CG configuration Y) is activated for the second component carrier (CC0). Aspects of the downlink control transmissions 1010, 1012 may be implemented by the repetition configuration 510 of FIG. 5.

In the illustrated example, the CG configuration X may configure the apparatus to transmit a repetition 1020 (e.g., PUSCH) of the first data transmission over the first component carrier (CC7) during the first cycle 1002 and to transmit a repetition 1022 (e.g., PUSCH) of the second data transmission over the first component carrier (CC7) during the second cycle 1004.

In the illustrated example, the CG configuration Y may configure the apparatus to transmit another repetition 1024 of the first data transmission over the second component carrier (CC0) during the first cycle 1002 and to transmit another repetition 1026 of the second data transmission over the second component carrier (CC0) during the second cycle 1004.

In the illustrated example, the apparatus transmits the first repetition 1020 earlier than the other repetition 1024 during the first cycle 1002. Similarly, the apparatus transmits the second repetition 1022 earlier than the other repetition 1026 during the second cycle 1004.

In the illustrated example, a receiving apparatus (e.g., a base station, such as the base station 102 of FIG. 1, the base station 180 of FIG. 1, the base station 310 of FIG. 3, the base station 402 of FIG. 4, and/or the base station 502 of FIG. 5) receiving the transmissions from the apparatus may combine the transmissions and/or repetitions receiving during the same cycle. For example, with respect to the first cycle 1002, the receiving apparatus may combine the repetitions 1020, 1024 transmitted by the apparatus during the first cycle 1002 to determine the first data transmission. Similarly, with respect to the second cycle 1004, the receiving apparatus may combine the repetitions 1022, 1026 transmitted by the apparatus during the second cycle 1004 to determine the second data transmission.

Figure 11:
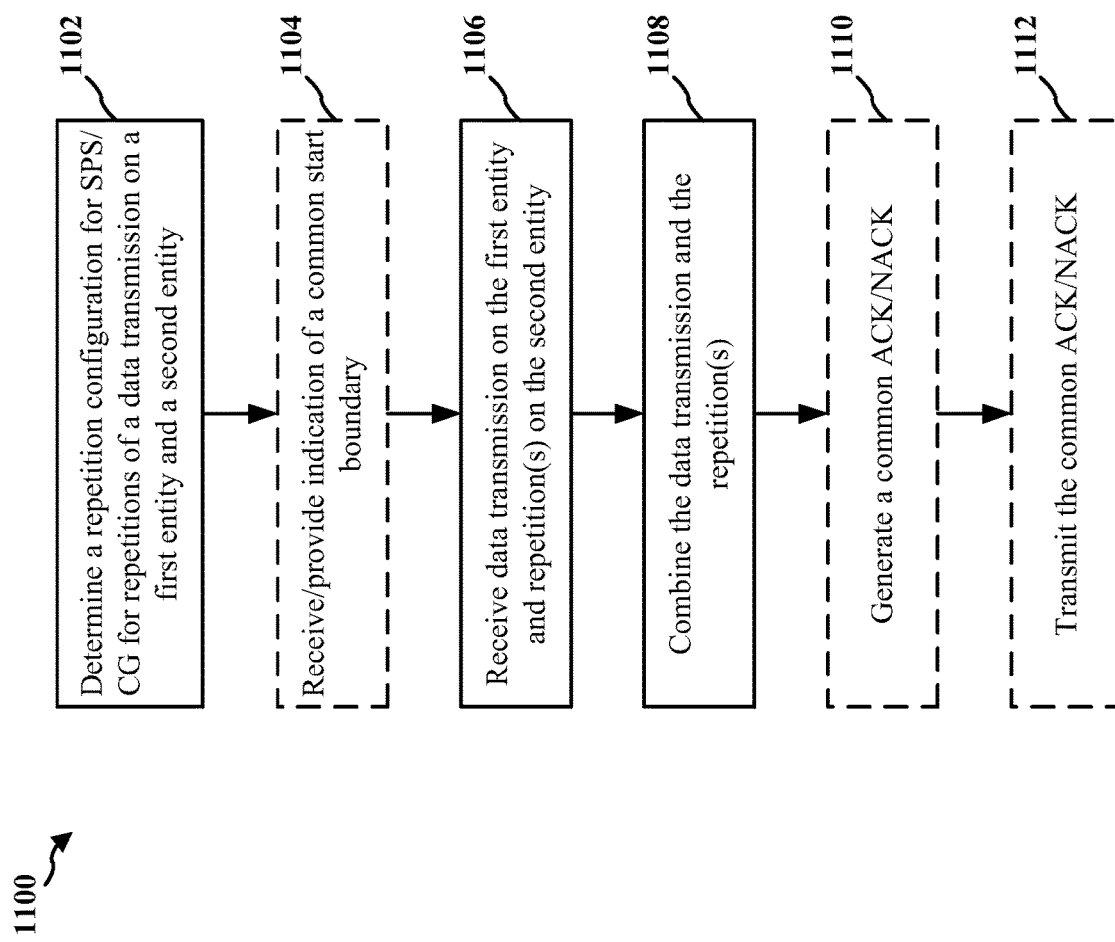
FIG. 11 is a flowchart of a method of wireless communication, in accordance with the teachings disclosed herein.

FIG. 11 is a flowchart 1100 of a method of wireless communication. The method may be performed by a UE (e.g., the UE 104, the UE 350, the UE 404, the UE 504, and/or the UE 904; the apparatus 1202) or a component of a UE which may include the memory 360 and which may be the entire UE or a component of the UE, such as the TX processor 368, the RX processor 356, and/or the controller/processor 359. The method may be performed by a base station (e.g., the base station 102, the base station 180, the base station 310, the base station 402, the base station 502, and/or the base station 902; the apparatus 1402) or a component of a base station, which may include the memory 376 and which may be the entire base station or a component of the base station, such as the TX processor 316, the RX processor 370, and/or the controller/processor 375). Optional aspects are illustrated with a dashed line.

At 1102, the device determines a repetition configuration for SPS or a CG associated with a data transmission on a first entity and at least one repetition of the data transmission on a second entity, as described above in connection with, for example, 512 of FIG. 5 and/or 912 of FIG. 9. For example, 1102 may be performed by a configuration component 1240 of the apparatus 1202 of FIG. 12. The first entity and the second entity may each comprise a frequency resource. In another example, the first entity and the second entity may each comprise a cell or a component carrier.

At 1106, the device receives the data transmission and the at least one repetition of the data transmission, as described above in connection with, for example, the data transmission 514 and the repetition(s) 516 of FIG. 5 and/or the data transmission 914 and the repetition(s) 916 of FIG. 9. For example, 1106 may be performed by a reception component 1230 of the apparatus 1202 and/or the data component 1242 of the apparatus 1202. The data transmission may be received on the first entity, and the at least one repetition may be received on the second entity. In some examples, multiple repetitions of the data transmission may be transmitted on different entities than the first entity. Although the reception of the data transmission and the repetition(s) of the data transmission are illustrated together, the reception may also be performed separately. If the method of FIG. 11 is performed by a UE, the data transmission may be received on a downlink data channel (e.g., PDSCH) on the first entity and a repetition of the data transmission may be received on a downlink data channel (e.g., PDSCH) on the second entity. If the method of FIG. 11 is performed by a base station, the data transmission may be received on an uplink data channel (e.g., PUSCH) on the first entity and a repetition of the data transmission may be received on an uplink data channel (e.g., PUSCH) on the second entity.

At 1108, the device combines the data transmission and the at least one repetition of the data transmission to decode the data transmission, as described above in connection with, for example, 518 of FIG. 5 and/or 918 of FIG. 9. For example, 1108 may be performed by a combination component 1244 of the apparatus 1202 of FIG. 12.

In an example in which the method is performed by a UE, the data transmission may comprise a downlink data transmission, e.g., on a downlink shared channel. In such an example, the UE may generate a common ACK/NACK signal based on the decoding of the data transmission, at 1110, as described above in connection with, for example, 520 of FIG. 5. For example, 1110 may be performed by an ACK/NACK component 1246 of the apparatus 1202 of FIG. 12. For example, the UE may send an ACK to the base station if the UE was able to combine the repetitions of the data transmission to correctly receive the data transmission. If the UE was not able to correctly receive the data transmission after combining the repetitions, the UE may send a NACK to the bases station. The NACK may prompt the base station to retransmit the data transmission to the UE.

At 1112, the UE may transmit the common ACK/NACK signal, as described above in connection with, for example, the common ACK/NACK signal 522 of FIG. 5. For example, 1112 may be performed by the ACK/NACK component 1246 of the apparatus 1202 and/or the transmission component 1234 of the apparatus 1202. In a first example, the ACK/NACK signal may be transmitted using a third entity configured for a transmission of a control channel associated with the first entity. In a second example, the ACK/NACK signal may be transmitted using a third entity configured for a transmission of a control channel associated with the second entity. The common ACK/NACK signal may be associated with a bit location in an ACK/NACK codebook carried by an uplink control channel on the third entity. The bit location may be based on a temporal distance between a repetition of the data transmission on the second entity and the uplink control channel on the third entity. In a second example, the ACK/NACK signal may be transmitted using a third entity configured for a transmission of a control channel associated with the second entity. The common ACK/NACK signal may be associated with a bit location in an ACK/NACK codebook carried by the uplink control channel on the third entity. The bit location may be based on a temporal distance between the repetition of the data transmission on the second entity and the uplink control channel on the third entity. In another example, the common ACK/NACK signal may be transmitted using more than one entity (e.g., as described in connection with FIG. 7).

A temporal distance between transmitting an earliest common ACK/NACK signal and receiving a last repetition of the data transmission may be greater than a distance threshold. The distance threshold corresponds to a duration for combining and decoding the data transmission and the at least one repetition of the data transmission. The third entity may be associated with a last entity for a last repetition of the data transmission.

Identifiers (IDs) of the SPS or the CG that are configured to carry combinable repetitions on different entities may be indicated by a base station via a least one of RRC signaling, DCI signaling, or a MAC-CE. The at least one repetition of the data transmission may be restricted to a subset of HARQ process identifiers associated with the identifiers of the SPS or the CG that are configured as indicated by the base station.

The data transmission may be comprised in a downlink data channel configured based on the SPS. In another example, the method may be performed by the base station. Thus, the data transmission may be comprised in an uplink data channel (e.g., PUSCH) received from a UE. The uplink data channel may be configured based on the CG.

Each of the at least one repetition of the data transmission may be associated with a same cycle having a common start boundary. As illustrated at 1104, an indication may be received of the common start boundary via downlink control information (DCI) signaling, as described above in connection with, for example, the common start boundaries 602a, 604a of FIG. 6, the common start boundaries 702a, 704a of FIG. 7, the common start boundaries 802a, 804a of FIG. 8, and/or the common start boundaries 1002a, 1004a of FIG. 10. For example, 1104 may be performed by a boundary component 1248 of the apparatus 1202 of FIG. 12. The data transmission and the at least one repetition of the data transmission may be received during the same cycle.

Figure 12:
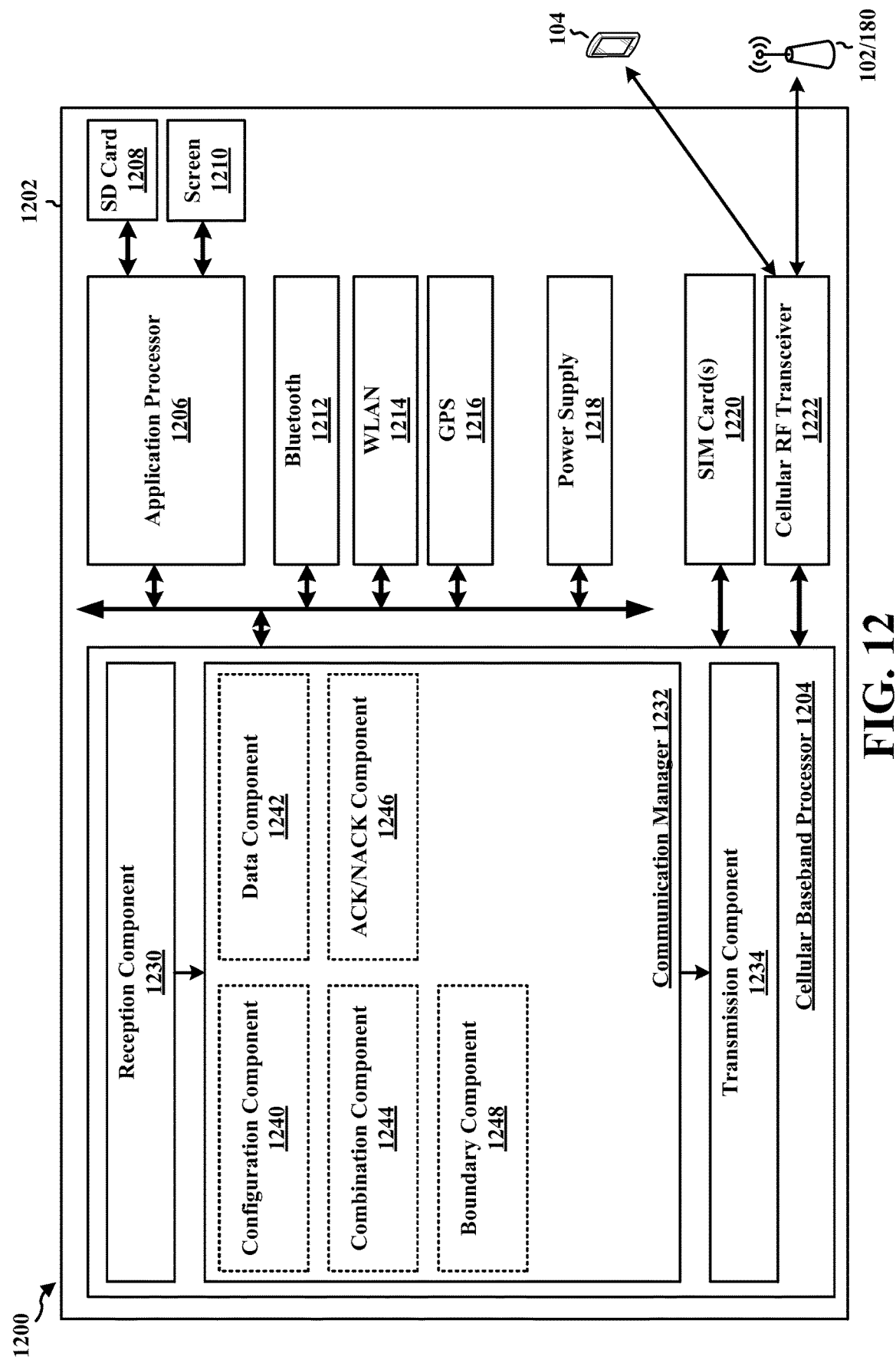
FIG. 12 is a diagram illustrating an example of a hardware implementation for an example apparatus, in accordance with the teachings disclosed herein.

FIG. 12 is a diagram 1200 illustrating an example of a hardware implementation for an apparatus 1202. The apparatus 1202 is a UE and includes a cellular baseband processor 1204 (also referred to as a modem) coupled to a cellular RF transceiver 1222 and one or more subscriber identity modules (SIM) cards 1220, an application processor 1206 coupled to a secure digital (SD) card 1208 and a screen 1210, a Bluetooth module 1212, a wireless local area network (WLAN) module 1214, a Global Positioning System (GPS) module 1216, and a power supply 1218. The cellular baseband processor 1204 communicates through the cellular RF transceiver 1222 with the UE 104 and/or BS 102/180. The cellular baseband processor 1204 may include a computer-readable medium/memory. The cellular baseband processor 1204 is responsible for general processing, including the execution of software stored on the computer-readable medium/memory. The software, when executed by the cellular baseband processor 1204, causes the cellular baseband processor 1204 to perform the various functions described supra. The computer-readable medium/memory may also be used for storing data that is manipulated by the cellular baseband processor 1204 when executing software. The cellular baseband processor 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the cellular baseband processor 1204. The cellular baseband processor 1204 may be a component of the UE 350 and may include the memory 360 and/or at least one of the TX processor 368, the RX processor 356, and the controller/processor 359. In one configuration, the apparatus 1202 may be a modem chip and include just the baseband processor 1204, and in another configuration, the apparatus 1202 may be the entire UE (e.g., see the UE 350 of FIG. 3) and include the aforediscussed additional modules of the apparatus 1202.

The communication manager 1232 includes a configuration component 1240, a data component 1242, a combination component 1244, an ACK/NACK component 1246, and a boundary component 1248 that may be configured to perform the aspects described in connection with FIG. 11.

The apparatus may include additional components that perform each of the blocks of the algorithm in the aforementioned flowchart of FIG. 11. As such, each block in the aforementioned flowchart of FIG. 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1202, and in particular the cellular baseband processor 1204, includes means for performing any of the aspects determining a repetition configuration for SPS or a CG associated with a data transmission on a first entity and at least one repetition of the data transmission on a second entity. The apparatus 1202 may also include means for receiving the data transmission and the at least one repetition of the data transmission. The apparatus 1202 may also include means for combining the data transmission and the at least one repetition of the data transmission to decode the data transmission. The apparatus 1202 may also include means for generating a common ACK/NACK signal based on the decoding of the data transmission when the data transmission comprises a downlink data transmission. The apparatus 1202 may also include means for transmitting the common ACK/NACK signal using a third entity configured for a transmission of a control channel associated with the first entity when the data transmission comprises a downlink data transmission. The apparatus 1202 may also include means for generating a common ACK/NACK signal based on the decoding of the data transmission when the data transmission comprises a downlink data transmission. The apparatus 1202 may also include means for transmitting, to a base station, the common ACK/NACK signal using a third entity configured for a transmission of an uplink control channel, the third entity being associated with the second entity, when the data transmission comprises a downlink data transmission. The apparatus 1202 may also include means for receiving an indication of the common start boundary via DCI signaling.

If the apparatus 1202 comprises a UE, the aforementioned means may be one or more of the aforementioned components of the apparatus 1202 configured to perform the functions recited by the aforementioned means. As described supra, the apparatus 1202 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

If the apparatus 1202 comprises a base station, the aforementioned means may be one or more of the aforementioned components of the apparatus 1202 configured to perform the functions recited by the aforementioned means. As described supra, the apparatus 1202 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 13:
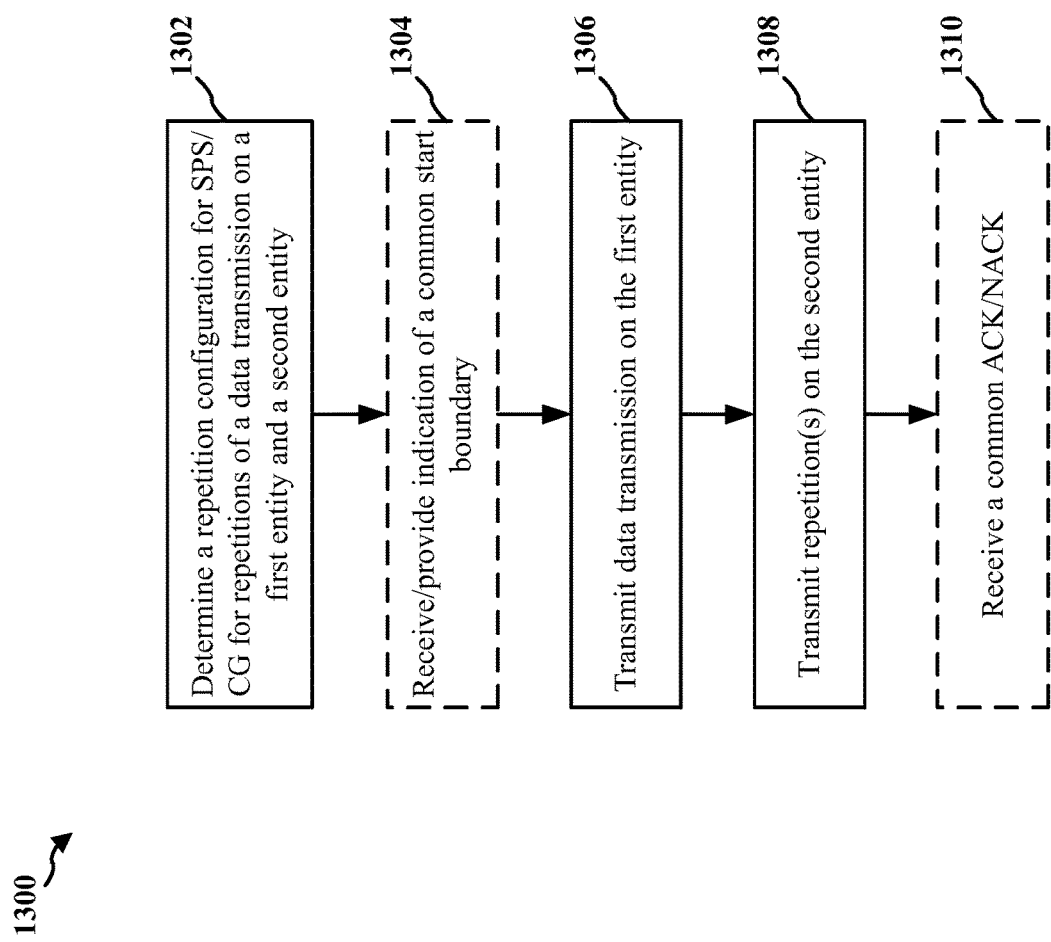
FIG. 13 is a flowchart of a method of wireless communication, in accordance with the teachings disclosed herein.

FIG. 13 is a flowchart 1300 of a method of wireless communication. The method may be performed by a UE (e.g., the UE 104, the UE 350, the UE 404, the 504, and/or the UE 904; the apparatus 1202) or a component of a UE which may include the memory 360 and which may be the entire UE or a component of the UE, such as the TX processor 368, the RX processor 356, and/or the controller/processor 359. The method may be performed by a base station (e.g., the base station 102, the base station180, the base station 310, the base station 402, the base station 502, and/or the base station 902; the apparatus 1402) or a component of a base station, which may include the memory 376 and which may be the entire base station or a component of the base station, such as the TX processor 316, the RX processor 370, and/or the controller/processor 375). Optional aspects are illustrated with a dashed line.

At 1302, the device determines a repetition configuration for SPS or a CG associated with a data transmission on a first entity and at least one repetition of the data transmission on a second entity, as described above in connection with, for example, 512 of FIG. 5 and/or 912 of FIG. 9. For example, 1302 may be performed by a configuration component 1440 of the apparatus 1402 of FIG. 14. The first entity and the second entity may each comprise a frequency resource. In another example, the first entity and the second entity may each comprise a cell or a component carrier.

At 1306, the device transmits the data transmission, as described above in connection with, for example, the data transmission 514 of FIG. 5 and/or the data transmission 914 of FIG. 9. For example, 1306 may be performed by the transmission component 1434 of the apparatus 1402 and/or the data component 1442 of the apparatus 1402. The data transmission may be transmitted on the first entity.

At 1308, the device transmits at least one repetition of the data transmission, as described above in connection with, for example, the repetition(s) 516 of FIG. 5 and/or the repetition(s) 916 of FIG. 9. For example, 1308 may be performed by a repetition component 1444 of the apparatus 1402. The at least one repetition may be transmitted on the second entity. In some examples, multiple repetitions of the data transmission may be transmitted on different entities than the first entity. If the method is performed by a UE, the data transmission may be transmitted on a uplink data channel on the first entity and a repetition of the data transmission may be transmitted on an uplink data channel on the second entity. If the method is performed by a base station, the data transmission may be transmitted on an downlink data channel on the first entity and a repetition of the data transmission may be transmitted on a downlink data channel on the second entity.

At 1310, the device may receive a common ACK/NACK signal, as described above in connection with the common ACK/NACK signal 522 of FIG. 5. For example, 1310 may be performed by a reception component 1430 of the apparatus 1402 and/or an ACK/NACK component 1446. For example, a base station may receive an ACK if the UE was able to combine the repetitions of the data transmission to correctly receive the data transmission. If the UE was not able to correctly receive the data transmission after combining the repetitions, the base station may receive a NACK. The NACK may prompt the base station to retransmit the data transmission to the UE. In a first example, the ACK/NACK signal may be receiving using a third entity configured for a control channel associated with the first entity. In a second example, the ACK/NACK signal may be received using a third entity configured for a control channel associated with the second entity. The common ACK/NACK signal may be associated with a bit location in an ACK/NACK codebook carried by an uplink control channel on the third entity. The bit location may be based on a temporal distance between a repetition of the data transmission on the second entity and the uplink control channel on the third entity. In a second example, the ACK/NACK signal may be received using a third entity configured for a control channel associated with the second entity. The common ACK/NACK signal may be associated with a bit location in an ACK/NACK codebook carried by the uplink control channel on the third entity. The bit location may be based on a temporal distance between the repetition of the data transmission on the second entity and the uplink control channel on the third entity. In another example, the common ACK/NACK signal may be received using more than one entity (e.g., as described in connection with FIG. 7).

A temporal distance between receiving an earliest common ACK/NACK signal and transmitting a last repetition of the data transmission may be greater than a distance threshold. The distance threshold corresponds to a duration for combining and decoding the data transmission and the at least one repetition of the data transmission. The third entity may be associated with a last entity for a last repetition of the data transmission.

Identifiers (IDs) of the SPS or the CG that are configured to carry combinable repetitions on different entities may be indicated by a base station, e.g., via a least one of RRC signaling, DCI signaling, or a MAC-CE. The at least one repetition of the data transmission may be restricted to a subset of HARQ process identifiers associated with the identifiers of the SPS or the CG that are configured as indicated by the base station.

The data transmission may be comprised in a downlink data channel configured based on the SPS. In another example, the method may be performed by a UE. Thus, the data transmission may be comprised in an uplink data channel transmitted from a UE. The uplink data channel may be configured based on the CG.

Each of the at least one repetition of the data transmission may be associated with a same cycle having a common start boundary. As illustrated at 1304, an indication may be received/transmitted of the common start boundary via downlink control information (DCI) signaling, as described above in connection with, for example, the common start boundaries 602a, 604a of FIG. 6, the common start boundaries 702a, 704a of FIG. 7, the common start boundaries 802a, 804a of FIG. 8, and/or the common start boundaries 1002a, 1004a of FIG. 10. For example, 1304 may be performed by a boundary component 1448 of the apparatus 1402 of FIG. 14. The data transmission and the at least one repetition of the data transmission may be transmitted during the same cycle.

Figure 14:
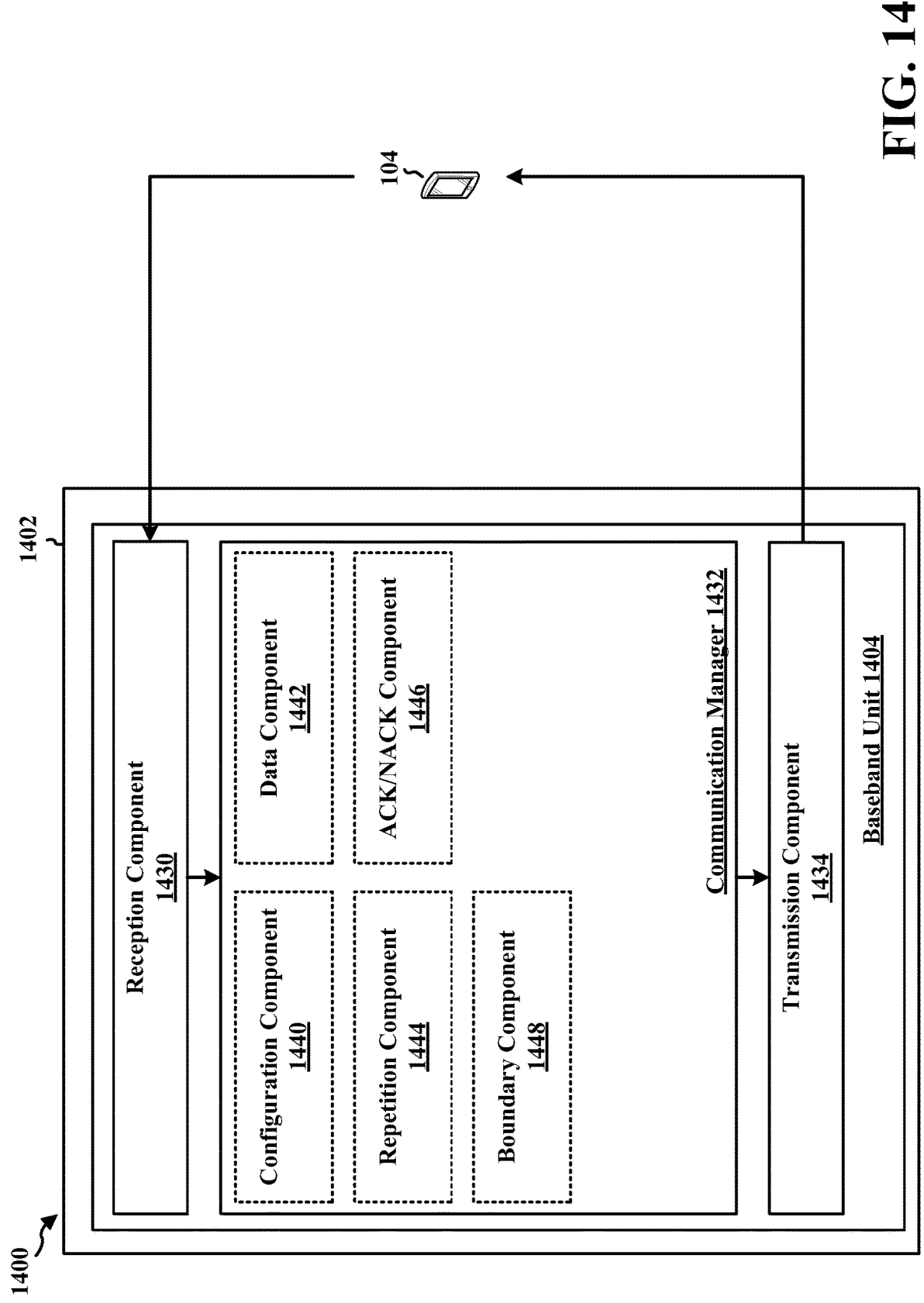
FIG. 14 is a diagram illustrating an example of a hardware implementation for an example apparatus, in accordance with the teachings disclosed herein.

FIG. 14 is a diagram 1400 illustrating an example of a hardware implementation for an apparatus 1402. The apparatus 1402 is a BS and includes a baseband unit 1404. The baseband unit 1404 may communicate through a cellular RF transceiver with the UE 104. The baseband unit 1404 may include a computer-readable medium/memory. The baseband unit 1404 is responsible for general processing, including the execution of software stored on the computer-readable medium/memory. The software, when executed by the baseband unit 1404, causes the baseband unit 1404 to perform the various functions described supra. The computer-readable medium/memory may also be used for storing data that is manipulated by the baseband unit 1404 when executing software. The baseband unit 1404 further includes a reception component 1430, a communication manager 1432, and a transmission component 1434. The communication manager 1432 includes the one or more illustrated components. The components within the communication manager 1432 may be stored in the computer-readable medium/memory and/or configured as hardware within the baseband unit 1404. The baseband unit 1404 may be a component of the base station 310 and may include the memory 376 and/or at least one of the TX processor 316, the RX processor 370, and the controller/processor 375.

The communication manager 1432 includes a configuration component 1440, a data component 1442, a repetition component 1444, an ACK/NACK component 1446, and a boundary component 1448 that may be configured to perform the aspects described in connection with FIG. 13.

The apparatus may include additional components that perform each of the blocks of the algorithm in the aforementioned flowchart of FIG. 13. As such, each block in the aforementioned flowchart of FIG. 13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1402, and in particular the baseband unit 1404, includes means for determining a repetition configuration for SPS or a CG associated with a data transmission on a first entity and at least one repetition of the data transmission on a second entity. The apparatus 1402 may also include means for transmitting the data transmission on the first entity. The apparatus 1402 may also include means for transmitting the at least one repetition of the data transmission on the second entity. The apparatus 1402 may also include means for receiving a common ACK/NACK signal for the data transmission from a UE, where the common ACK/NACK is received using a third entity configured for a transmission of a control channel associated with the first entity, when the data transmission comprises a downlink data transmission. The apparatus 1402 may also include means for receiving a common ACK/NACK signal for the data transmission from a UE, where the common ACK/NACK is received using a third entity configured for a transmission of an uplink control channel, the third entity being associated with the second entity, when the data transmission comprises a downlink data transmission. The apparatus 1402 may also include means for receiving an indication of the common start boundary via DCI signaling.

If the apparatus 1402 comprises a UE, the aforementioned means may be one or more of the aforementioned components of the apparatus 1402 configured to perform the functions recited by the aforementioned means. As described supra, the apparatus 1402 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

If the apparatus 1402 comprises a base station, the aforementioned means may be one or more of the aforementioned components of the apparatus 1402 configured to perform the functions recited by the aforementioned means. As described supra, the apparatus 1402 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if" "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following examples are illustrative only and may be combined with aspects of other embodiments or teachings described herein, without limitation.

Example 1 is a method of wireless communication, comprising: determining a repetition configuration for SPS or a CG associated with a data transmission on a first entity and at least one repetition of the data transmission on a second entity; receiving the data transmission and the at least one repetition of the data transmission; and combining the data transmission and the at least one repetition of the data transmission to decode the data transmission.

In Example 2, the method of Example 1 further includes that the first entity and the second entity each comprise a frequency resource.

In Example 3, the method of any of Example 1 or Example 2 further includes that the first entity and the second entity each comprise a cell or a component carrier.

In Example 4, the method of any of Examples 1 to 3 further includes that the data transmission comprises a downlink data transmission, the method further comprising: generating a common ACK/NACK signal based on the decoding of the data transmission; and transmitting the common ACK/NACK signal using a third entity configured for a transmission of a control channel associated with the first entity.

In Example 5, the method of any of Examples 1 to 4 further includes that the common ACK/NACK signal is associated with a bit location in an ACK/NACK codebook carried by an uplink control channel on the third entity.

In Example 6, the method of any of Examples 1 to 5 further includes that the bit location is based on a temporal distance between a repetition of the data transmission on the second entity and the uplink control channel on the third entity.

In Example 7, the method of any of Examples 1 to 6 further includes that the data transmission comprises a downlink data transmission, the method further comprising: generating a common ACK/NACK signal based on the decoding of the data transmission; and transmitting, to a base station, the common ACK/NACK signal using a third entity configured for a transmission of an uplink control channel, the third entity being associated with the second entity.

In Example 8, the method of any of Examples 1 to 7 further includes that the common ACK/NACK signal is associated with a bit location in an ACK/NACK codebook carried by the uplink control channel on the third entity.

In Example 9, the method of any of Examples 1 to 8 further includes that the bit location is based on a temporal distance between a repetition of the data transmission on the second entity and the uplink control channel on the third entity.

In Example 10, the method of any of Examples 1 to 9 further includes that a temporal distance between transmitting an earliest common ACK/NACK signal and receiving a last repetition of the data transmission is greater than a distance threshold, wherein the distance threshold corresponds to a duration for combining and decoding the data transmission and the at least one repetition of the data transmission.

In Example 11, the method of any of Examples 1 to 10 further includes that the third entity is associated with a last entity for a last repetition of the data transmission.

In Example 12, the method of any of Examples 1 to 11 further includes that wherein identifiers of repetition configurations for the SPS or the CG that are configured to carry combinable repetitions on different entities are indicated by a base station via a least one of RRC signaling, DCI signaling, or a MAC-CE.

In Example 13, the method of any of Examples 1 to 12 further includes that the at least one repetition of the data transmission is restricted to a subset of HARQ process identifiers associated with the identifiers of the SPS or the CG that are configured as indicated by the base station.

In Example 14, the method of any of Examples 1 to 13 further includes that the data transmission is comprised in a downlink data channel configured based on the SPS.

In Example 15, the method of any of Examples 1 to 14 further includes that the method is performed by the base station, and wherein the data transmission is comprised in an uplink data channel configured based on the CG.

In Example 16, the method of any of Examples 1 to 15 further includes that each of the at least one repetition of the data transmission is associated with a same cycle having a common start boundary.

In Example 17, the method of any of Examples 1 to 16 further includes receiving an indication of the common start boundary via DCI signaling.

In Example 18, the method of any of Examples 1 to 17 further includes that the data transmission and the at least one repetition of the data transmission are received during the same cycle.

Example 19 is a device including one or more processors and one or more memories in electronic communication with the one or more processors storing instructions executable by the one or more processors to cause a system or an apparatus to implement a method as in any of Examples 1 to 18.

Example 20 is a system or apparatus including means for implementing a method or realizing an apparatus as in any of Examples 1 to 18.

Example 21 is a non-transitory computer-readable medium storing instructions executable by one or more processors to cause the one or more processors to implement a method as in any of Examples 1 to 18.

Example 22 is a method of wireless communication, comprising: determining a repetition configuration for SPS or a CG associated with a data transmission on a first entity and at least one repetition of the data transmission on a second entity; transmitting the data transmission on the first entity; and transmitting the at least one repetition of the data transmission on the second entity.

In Example 23, the method of Example 22 further includes that the first entity and the second entity each comprise a frequency resource.

In Example 24, the method of any of Example 22 or Example 23 further includes that the first entity and the second entity each comprise a cell or a component carrier.

In Example 25, the method of any of Examples 22 to 24 further includes that the data transmission comprises a downlink data transmission, the method further comprising: receiving a common ACK/NACK signal for the data transmission from a UE, wherein the common ACK/NACK is received using a third entity configured for a transmission of a control channel associated with the first entity.

In Example 26, the method of any of Examples 22 to 25 further includes that the common ACK/NACK signal is associated with a bit location in an ACK/NACK codebook carried by an uplink control channel on the third entity.

In Example 27, the method of any of Examples 22 to 26 further includes that the bit location is based on a temporal distance between a repetition of the data transmission on the second entity and the uplink control channel on the third entity.

In Example 28, the method of any of Examples 22 to 27 further includes that the data transmission comprises a downlink data transmission, the method further comprising: receiving a common ACK/NACK signal for the data transmission from a UE, wherein the common ACK/NACK is received using a third entity configured for a transmission of an uplink control channel, the third entity being associated with the second entity.

In Example 29, the method of any of Examples 22 to 28 further includes that the common ACK/NACK signal is associated with a bit location in an ACK/NACK codebook carried by the uplink control channel on the third entity.

In Example 30, the method of any of Examples 22 to 29 further includes that the bit location is based on a temporal distance between a repetition of the data transmission on the second entity and the uplink control channel on the third entity.

In Example 31, the method of any of Examples 22 to 30 further includes that a temporal distance between transmitting an earliest common ACK/NACK signal and receiving a last repetition of the data transmission is greater than a distance threshold, wherein the distance threshold corresponds to a duration for combining and decoding the data transmission and the at least one repetition of the data transmission.

In Example 32, the method of any of Examples 22 to 31 further includes that the third entity is associated with a last entity for a last repetition of the data transmission.

In Example 33, the method of any of Examples 22 to 32 further includes that identifiers of the SPS or the CG that are configured to carry combinable repetitions on different entities are indicated by a base station via a least one of RRC signaling, DCI signaling, or a MAC-CE.

In Example 34, the method of any of Examples 22 to 33 further includes that the at least one repetition of the data transmission is restricted to a subset of HARQ process identifiers associated with the identifiers of the SPS or the CG that are configured as indicated by the base station.

In Example 35, the method of any of Examples 22 to 34 further includes that the data transmission is comprised in a downlink data channel configured based on the SPS.

In Example 36, the method of any of Examples 22 to 35 further includes that the method is performed by a UE, and wherein the data transmission is comprised in an uplink data channel configured based on the CG.

In Example 37, the method of any of Examples 22 to 36 further includes that each of the at least one repetition of the data transmission is associated with a same cycle having a common start boundary.

In Example 38, the method of any of Examples 22 to 37 further includes receiving an indication of the common start boundary via DCI signaling.

In Example 39, the method of any of Examples 22 to 38 further includes that the data transmission and the at least one repetition of the data transmission are received during the same cycle.

Example 40 is a device including one or more processors and one or more memories in electronic communication with the one or more processors storing instructions executable by the one or more processors to cause a system or an apparatus to implement a method as in any of Examples 22 to 39.

Example 41 is a system or apparatus including means for implementing a method or realizing an apparatus as in any of Examples 22 to 39.

Example 42 is a non-transitory computer-readable medium storing instructions executable by one or more processors to cause the one or more processors to implement a method as in any of Examples 22 to 39.

What is claimed is:

1. A method of wireless communication, the method comprising:
   determining a repetition configuration for semi-persistent scheduling (SPS) or a configured grant (CG) associated with a data transmission on a first entity and at least one repetition of the data transmission on a second entity;
   receiving the data transmission and the at least one repetition of the data transmission within a first cycle;
   combining the data transmission and the at least one repetition of the data transmission into a combined data transmission based on a determination that a difference between a time at which the at least one repetition of the data transmission is received and a time at which an uplink control transmission is transmitted is greater than a distance threshold associated with the first cycle; and
   decoding the data transmission based on the combined data transmission.

2. The method of claim 1, wherein the first entity and the second entity each comprise a frequency resource.

3. The method of claim 1, wherein the first entity and the second entity each comprise a cell or a component carrier.

4. The method of claim 1, wherein the data transmission comprises a downlink data transmission, the method further comprising:
   generating a common acknowledgement/negative acknowledgement (ACK/NACK) signal based on decoding of the data transmission; and
   transmitting the common ACK/NACK signal using a third entity configured for a transmission of a control channel associated with the first entity.

5. The method of claim 4, wherein the common ACK/NACK signal is associated with a bit location in an ACK/NACK codebook carried by an uplink control channel on the third entity.

6. The method of claim 5, wherein the bit location is based on the difference in time between the at least one repetition of the data transmission on the second entity and the uplink control channel on the third entity.

7. The method of claim 1, wherein the data transmission comprises a downlink data transmission, the method further comprising:
   generating a common acknowledgement/negative acknowledgement (ACK/NACK) signal based on decoding of the data transmission; and
   transmitting, to a base station, the common ACK/NACK signal in the uplink control transmission using a third entity configured for a transmission of an uplink control channel, the third entity being associated with the second entity.

8. The method of claim 7, wherein the common ACK/NACK signal is associated with a bit location in an ACK/NACK codebook carried by the uplink control channel on the third entity.

9. The method of claim 7, further comprising determining that a temporal distance between transmitting an earliest common ACK/NACK signal and receiving a last repetition of the data transmission is greater than the distance threshold, wherein the distance threshold corresponds to a duration for combining and decoding the data transmission and the at least one repetition of the data transmission.

10. The method of claim 7, wherein the third entity is associated with a last entity for a last repetition of the data transmission.

11. The method of claim 1, wherein identifiers of repetition configurations for the SPS or the CG that are configured to carry combinable repetitions on different entities are indicated by a base station via a least one of radio resource control (RRC) signaling, downlink control information (DCI) signaling, or a medium access control-control element (MAC-CE).

12. The method of claim 11, wherein the at least one repetition of the data transmission is restricted to a subset of hybrid automatic repeat request (HARQ) process identifiers associated with the identifiers of the SPS or the CG that are configured as indicated by the base station.

13. The method of claim 11, wherein the data transmission is comprised in a downlink data channel configured based on the SPS.

14. The method of claim 11, wherein the method is performed by the base station, and wherein the data transmission is comprised in an uplink data channel configured based on the CG.

15. The method of claim 11, wherein each of the at least one repetition of the data transmission is associated with the first cycle having a common start boundary.

16. The method of claim 15, further comprising receiving an indication of the common start boundary via the DCI signaling.

17. An apparatus for wireless communication, comprising:
a memory; and
at least one processor coupled to the memory and configured to:
determine a repetition configuration for semi-persistent scheduling (SPS) or a configured grant (CG) associated with a data transmission on a first entity and at least one repetition of the data transmission on a second entity;
receive the data transmission and the at least one repetition of the data transmission within a first cycle;
combine the data transmission and the at least one repetition of the data transmission into a combined data transmission based on a determination that a difference between a time at which the at least one repetition of the data transmission is received and a time at which an uplink control transmission is transmitted is greater than a distance threshold associated with the first cycle; and
decoding the data transmission based on the combined data transmission.

18. A method of wireless communication, the method comprising:
determining a repetition configuration for semi-persistent scheduling (SPS) or a configured grant (CG) associated with a data transmission on a first entity and at least one repetition of the data transmission on a second entity;
transmitting the data transmission on the first entity within a first cycle;
transmitting the at least one repetition of the data transmission on the second entity within the first cycle; and
receiving an uplink control transmission based on a difference between a time at which the at least one repetition of the data transmission is transmitted and a time at which the uplink control transmission is received, the difference being greater than a distance threshold associated with the first cycle.

19. The method of claim 18, wherein the first entity and the second entity each comprise a frequency resource.

20. The method of claim 18, wherein the first entity and the second entity each comprise a cell or a component carrier.

21. The method of claim 18, wherein the data transmission comprises a downlink data transmission, the method further comprising:
receiving, from a user equipment (UE), a common acknowledgement/negative acknowledgement (ACK/NACK) signal for the data transmission, wherein the common ACK/NACK is received in the uplink control transmission using a third entity configured for a transmission of a control channel associated with the first entity.

22. The method of claim 18, wherein the data transmission comprises a downlink data transmission, the method further comprising:
receiving, from a user equipment (UE), a common acknowledgement/negative acknowledgement (ACK/NACK) signal for the data transmission, wherein the common ACK/NACK is received in the uplink control transmission using a third entity configured for a transmission of an uplink control channel, the third entity being associated with the second entity.

23. The method of claim 22, wherein the receiving the uplink control transmission comprises receiving an earliest common ACK/NACK signal and the transmitting the at least one repetition comprises transmitting a last repetition of the data transmission, the earliest common ACK/NACK signal being received after the last repetition of the data transmission is transmitted by a temporal distance that is greater than the distance threshold, wherein the distance threshold corresponds to a duration for combining and decoding the data transmission and the at least one repetition of the data transmission.

24. The method of claim 22, wherein the third entity is associated with a last entity for a last repetition of the data transmission.

25. The method of claim 18, wherein identifiers of the SPS or the CG that are configured to carry combinable repetitions on different entities are indicated by a base station via a least one of radio resource control (RRC) signaling, downlink control information (DCI) signaling, or a medium access control-control element (MAC-CE).

26. The method of claim 25, wherein the at least one repetition of the data transmission is restricted to a subset of hybrid automatic repeat request (HARQ) process identifiers associated with the identifiers of the SPS or the CG that are configured as indicated by the base station.

27. The method of claim 25, wherein the data transmission is comprised in a downlink data channel configured based on the SPS.

28. The method of claim 25, wherein the method is performed by a user equipment (UE), and wherein the data transmission is comprised in an uplink data channel configured based on the CG.

29. An apparatus for wireless communication at a base station, the apparatus comprising:
a memory; and
at least one processor coupled to the memory and configured to:
determine a repetition configuration for semi-persistent scheduling (SPS) or a configured grant (CG) associated with a data transmission on a first entity and at least one repetition of the data transmission on a second entity,
transmit the data transmission on the first entity within a first cycle,
transmit the at least one repetition of the data transmission on the second entity within the first cycle, and
receive an uplink control transmission based on a difference between a time at which the at least one repetition of the data transmission is transmitted and a time at which the uplink control transmission is received, the difference being greater than a distance threshold associated with the first cycle.

* * * * *